(12) United States Patent
Ohashi et al.

(10) Patent No.: US 9,864,167 B2
(45) Date of Patent: Jan. 9, 2018

(54) IMAGE FORMING LENS AND IMAGE CAPTURING DEVICE

(71) Applicants: Kazuyasu Ohashi, Chiba (JP); Yoshifumi Sudoh, Saitama (JP)

(72) Inventors: Kazuyasu Ohashi, Chiba (JP); Yoshifumi Sudoh, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/819,832

(22) Filed: Aug. 6, 2015

(65) Prior Publication Data

US 2016/0077309 A1 Mar. 17, 2016

(30) Foreign Application Priority Data

Sep. 17, 2014 (JP) ................... 2014-189115
Sep. 17, 2014 (JP) ................... 2014-189385

(51) Int. Cl.
*G02B 9/64* (2006.01)
*G02B 15/163* (2006.01)

(52) U.S. Cl.
CPC ............. *G02B 9/64* (2013.01); *G02B 15/163* (2013.01)

(58) Field of Classification Search
CPC . G02B 9/64; G02B 9/62; G02B 15/14; G02B 15/16; G02B 15/163
(Continued)

(56) References Cited

U.S. PATENT DOCUMENTS 5,153,779 A 10/1992 Ohashi
5,398,135 A 3/1995 Ohashi
(Continued)

FOREIGN PATENT DOCUMENTS

JP 2-134610 5/1990
JP 3-141313 * 6/1991
(Continued)

OTHER PUBLICATIONS

U.S. Appl. No. 14/572,973, filed Dec. 17, 2014.
(Continued)

*Primary Examiner* — Jordan Schwartz
(74) *Attorney, Agent, or Firm* — Oblon, McClelland, Maier & Neustadt, L.L.P.

(57) ABSTRACT

An image forming lens is formed by sequentially arranging, from an object side to an image side, a first lens group having positive refractive power, an aperture stop, a second lens group having positive refractive power, and a third lens group having positive or negative refractive power. When focusing is performed from a long distance to a short distance, the third lens group is fixed relative to an image surface, and the first lens group, the aperture stop, and the second lens group are moved integrally to the object side. In the image forming lens, the third lens group is formed by sequentially arranging, from the object side to the image side, two lenses in order of a negative lens and a positive lens, and a conditional expression is satisfied:

$$0.20 < D/L_{3F-I} < 0.60,$$

where
D is an air space between the negative lens and the positive lens which form the third lens group, and $L_{3F-I}$ is a distance from an object-side surface of the negative lens of the third lens group to the image surface.

19 Claims, 26 Drawing Sheets

(58) Field of Classification Search
USPC .................................................. 359/754–756
See application file for complete search history.

(56) References Cited

U.S. PATENT DOCUMENTS

| | | | |
|---|---|---|---|
| 5,576,891 A | 11/1996 | Ohashi | |
| 5,581,319 A | 12/1996 | Ohashi | |
| 5,617,254 A | 4/1997 | Ohashi | |
| 5,630,188 A | 5/1997 | Ohashi | |
| 5,687,401 A | 11/1997 | Kawamura et al. | |
| 5,886,827 A * | 3/1999 | Ryzhikov | G02B 21/02 359/656 |
| 5,930,056 A | 7/1999 | Ohashi | |
| 5,995,251 A * | 11/1999 | Hesselink | G11B 7/0065 359/22 |
| 6,353,506 B1 | 3/2002 | Ohashi | |
| 6,549,343 B2 * | 4/2003 | Yoneyama | G02B 13/02 359/745 |
| 2002/0024745 A1 | 2/2002 | Ohashi | |
| 2002/0060855 A1 | 5/2002 | Ohashi | |
| 2002/0101665 A1 | 8/2002 | Ohashi et al. | |
| 2003/0210473 A1 | 11/2003 | Ohashi | |
| 2004/0004772 A1 | 1/2004 | Ohashi et al. | |
| 2004/0008420 A1 | 1/2004 | Ohashi | |
| 2004/0136088 A1 | 7/2004 | Ohashi | |
| 2005/0036208 A1 | 2/2005 | Ohashi | |
| 2005/0094002 A1 | 5/2005 | Ohashi | |
| 2005/0094285 A1 | 5/2005 | Ohashi | |
| 2005/0122596 A1 | 6/2005 | Ohashi | |
| 2005/0190457 A1 | 9/2005 | Ohashi | |
| 2005/0270663 A1 | 12/2005 | Ohashi | |
| 2006/0017836 A1 | 1/2006 | Nuno et al. | |
| 2006/0193062 A1 | 8/2006 | Ohashi | |
| 2006/0262422 A1 | 11/2006 | Ohashi | |
| 2007/0097517 A1 | 5/2007 | Ohashi | |
| 2007/0201144 A1 | 8/2007 | Sudoh | |
| 2007/0247726 A1 | 10/2007 | Sudoh | |
| 2007/0297068 A1 | 12/2007 | Ohashi | |
| 2008/0106799 A1 | 5/2008 | Ohashi | |
| 2008/0117527 A1 | 5/2008 | Nuno et al. | |
| 2008/0151385 A1 * | 6/2008 | Ohashi | G02B 15/177 359/689 |
| 2008/0198477 A1 | 8/2008 | Ohashi | |
| 2008/0204894 A1 | 8/2008 | Ohashi | |
| 2008/0218724 A1 | 9/2008 | Nishina et al. | |
| 2008/0278779 A1 | 11/2008 | Nishina et al. | |
| 2009/0067060 A1 | 3/2009 | Sudoh | |
| 2009/0080088 A1 | 3/2009 | Ohashi | |
| 2009/0091841 A1 | 4/2009 | Ohashi | |
| 2009/0122418 A1 | 5/2009 | Atsuumi et al. | |
| 2009/0135500 A1 | 5/2009 | Sudoh et al. | |
| 2009/0147375 A1 | 6/2009 | Sudoh et al. | |
| 2009/0213440 A1 | 8/2009 | Nishina et al. | |
| 2009/0323200 A1 | 12/2009 | Sudoh | |
| 2010/0007967 A1 | 1/2010 | Ohashi | |
| 2010/0027136 A1 | 2/2010 | Ohashi et al. | |
| 2010/0271710 A1 | 10/2010 | Ohashi | |
| 2010/0296180 A1 | 11/2010 | Sudoh et al. | |
| 2011/0043927 A1 | 2/2011 | Sudoh | |
| 2011/0051260 A1 | 3/2011 | Nakayama et al. | |
| 2011/0069402 A1 | 3/2011 | Sudoh | |
| 2011/0222169 A1 | 9/2011 | Sudoh | |
| 2011/0228408 A1 | 9/2011 | Sudoh | |
| 2011/0273781 A1 | 11/2011 | Nuno et al. | |
| 2011/0310496 A1 | 12/2011 | Kubota et al. | |
| 2011/0317285 A1 | 12/2011 | Ohashi et al. | |
| 2012/0127586 A1 | 5/2012 | Sudoh | |
| 2012/0212838 A1 | 8/2012 | Ohashi | |
| 2012/0236421 A1 * | 9/2012 | Tsai | G02B 13/004 359/780 |
| 2013/0194488 A1 | 8/2013 | Kubota et al. | |
| 2013/0194681 A1 | 8/2013 | Ohashi et al. | |
| 2013/0265649 A1 | 10/2013 | Ohashi | |
| 2013/0321936 A1 | 12/2013 | Ohashi | |
| 2014/0016214 A1 | 1/2014 | Kubota et al. | |
| 2014/0078605 A1 | 3/2014 | Ohashi | |
| 2014/0126072 A1 | 5/2014 | Ohashi et al. | |
| 2014/0139932 A1 | 5/2014 | Ohashi | |
| 2014/0293457 A1 | 10/2014 | Sudoh | |
| 2014/0340768 A1 | 11/2014 | Kubota et al. | |
| 2015/0043087 A1 | 2/2015 | Sudoh | |
| 2015/0062718 A1 | 3/2015 | Ohashi | |
| 2015/0070780 A1 | 3/2015 | Sudoh | |
| 2015/0116829 A1 | 4/2015 | Ohashi | |
| 2015/0130961 A1 | 5/2015 | Sudoh | |
| 2015/0212303 A1 | 7/2015 | Ohashi | |
| 2015/0293327 A1 * | 10/2015 | Tomioka | G02B 13/02 359/754 |

FOREIGN PATENT DOCUMENTS

| | | |
|---|---|---|
| JP | 2008-257088 | 10/2008 |
| JP | 2010-175628 | 8/2010 |
| JP | 2013-218015 | 10/2013 |

OTHER PUBLICATIONS

U.S. Appl. No. 14/584,167, filed Dec. 29, 2014.
U.S. Appl. No. 14/617,118, filed Feb. 9, 2015.
U.S. Appl. No. 14/637,932, filed Mar. 4, 2015.

* cited by examiner

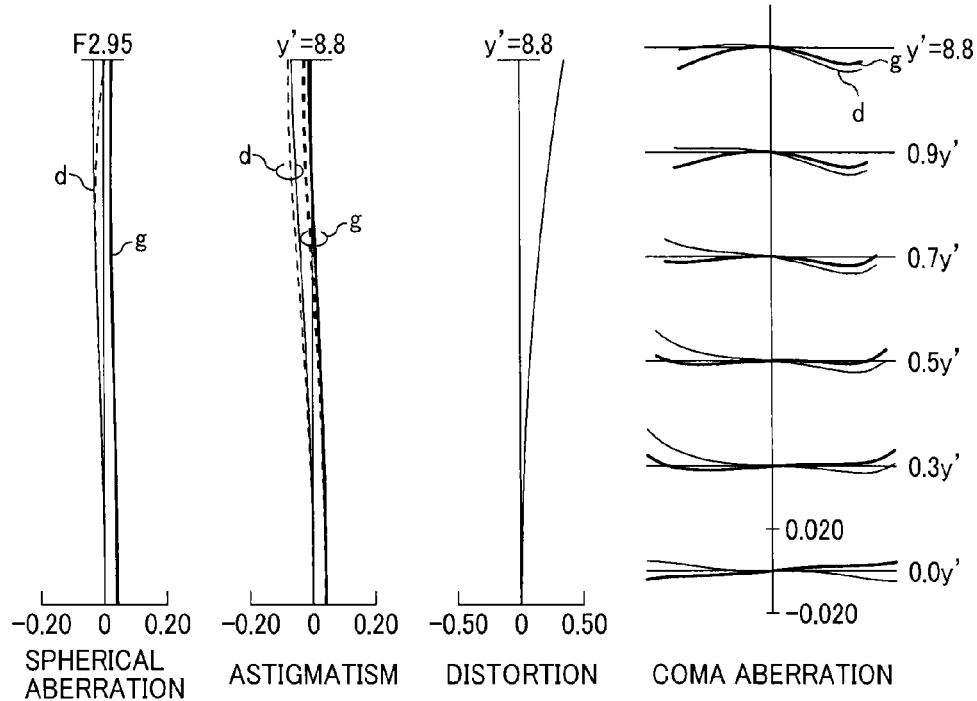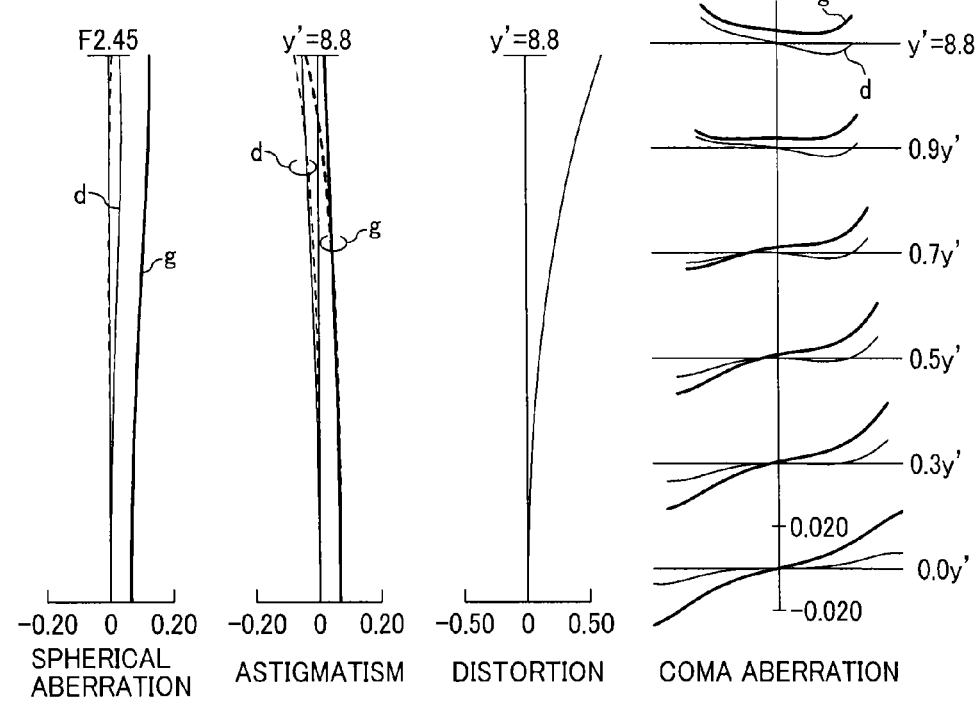

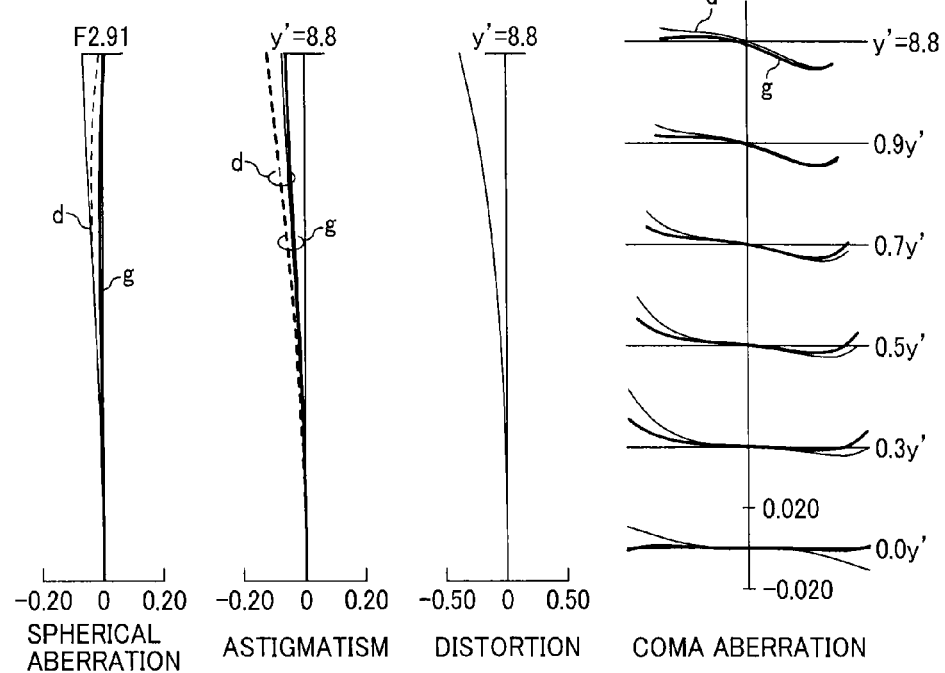
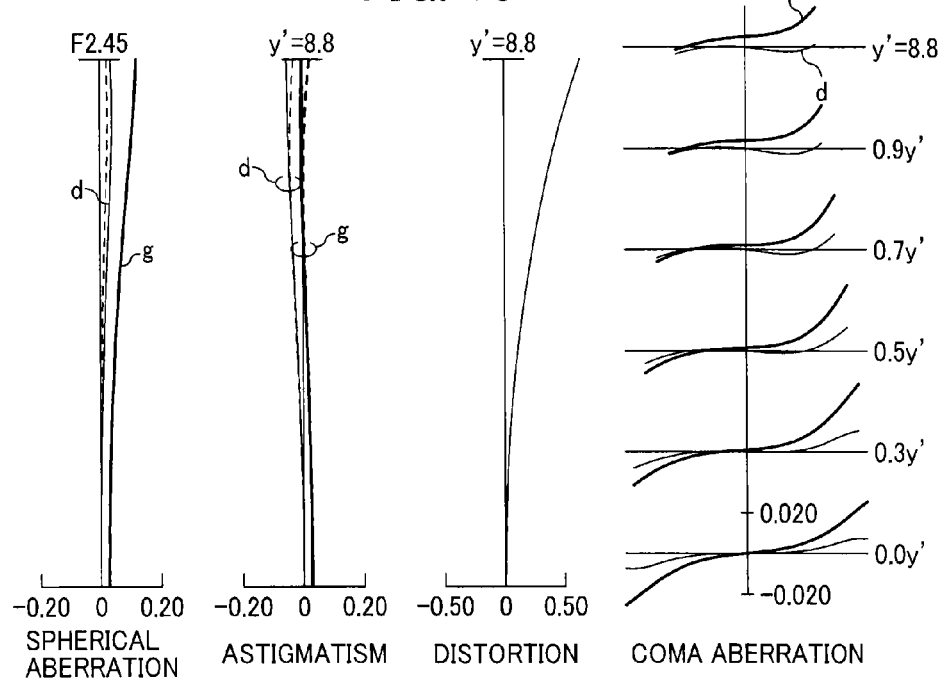

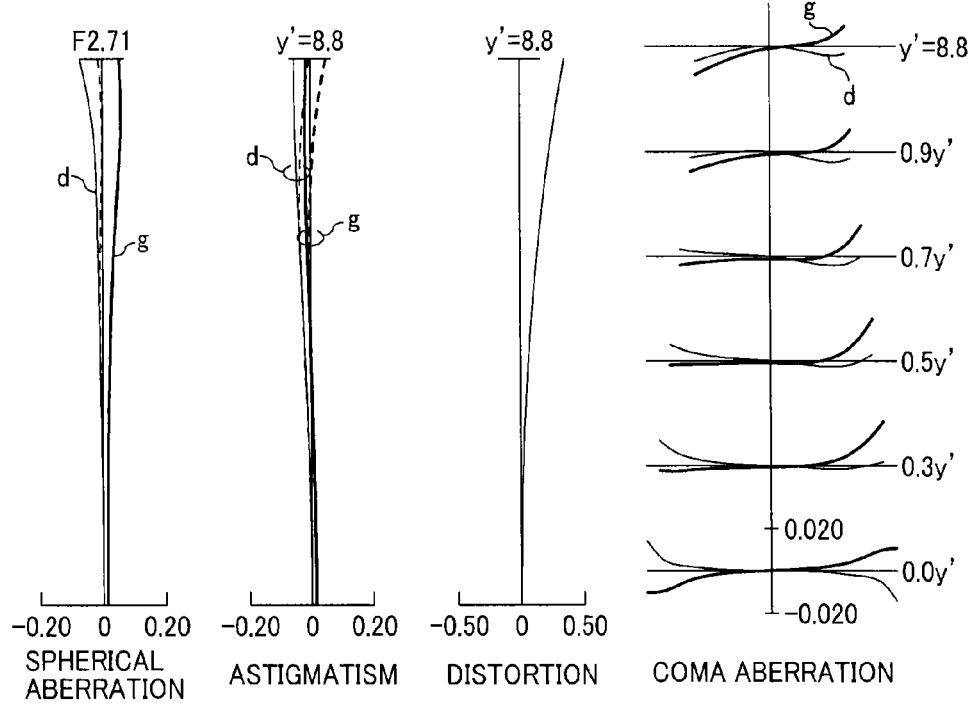
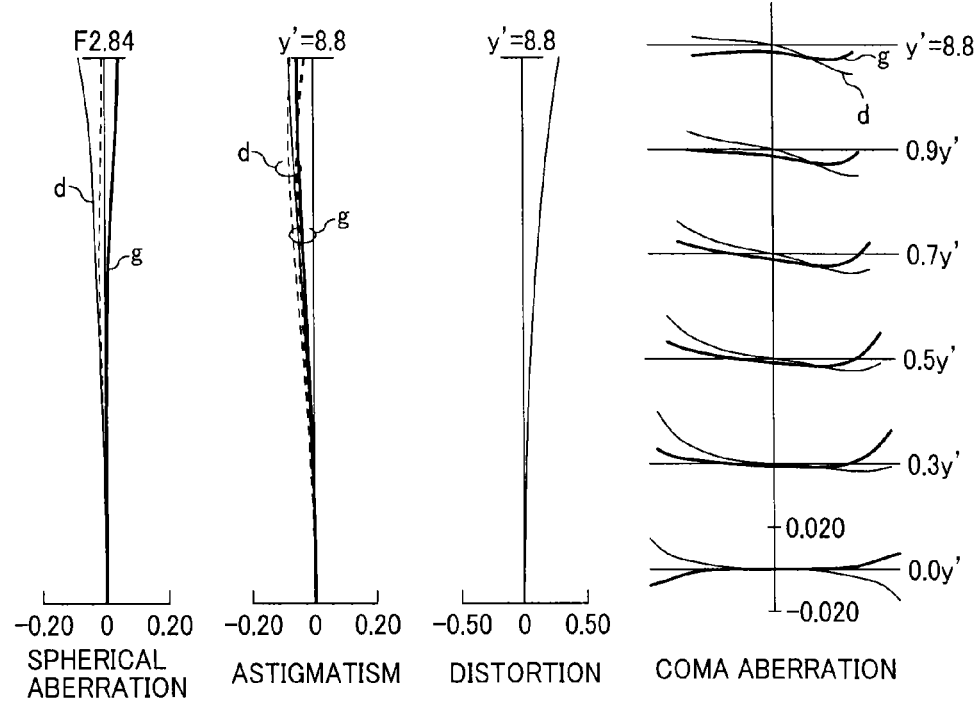

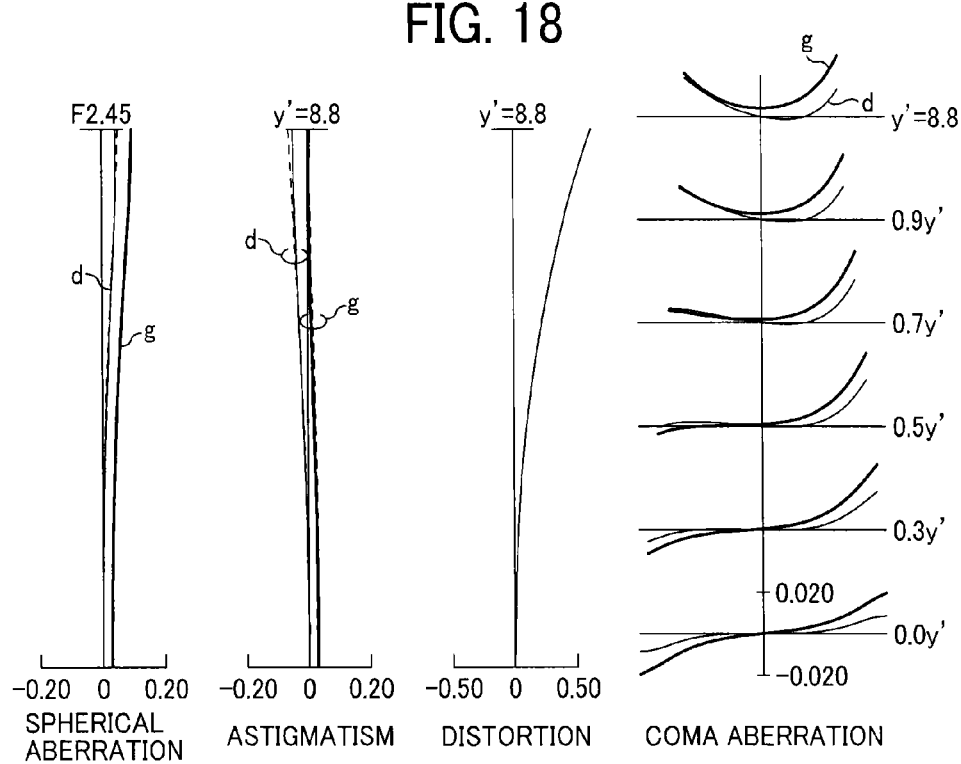
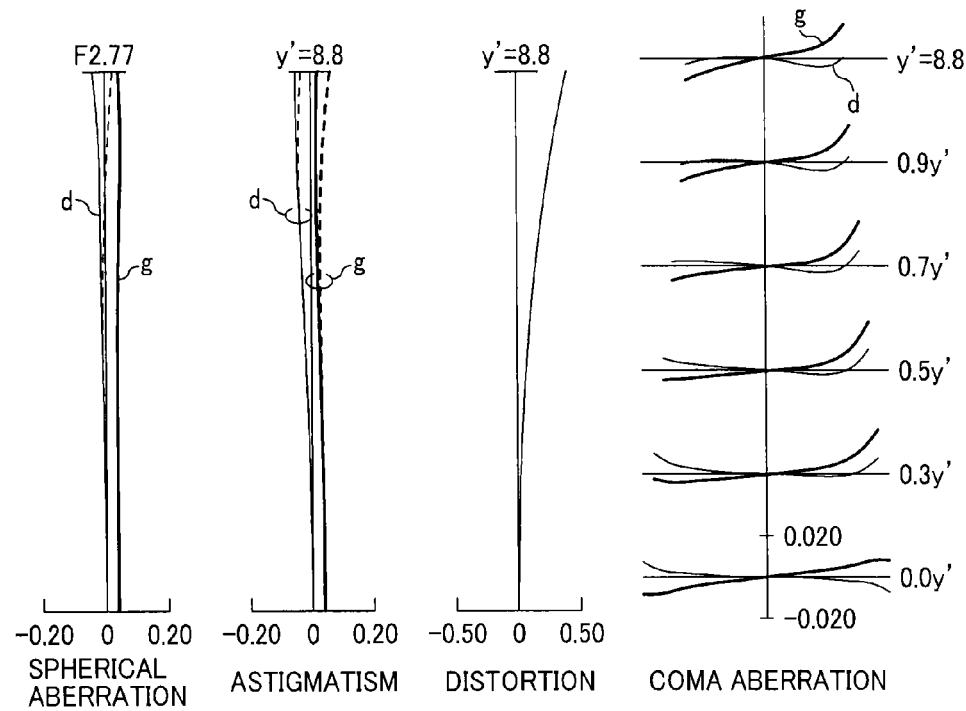

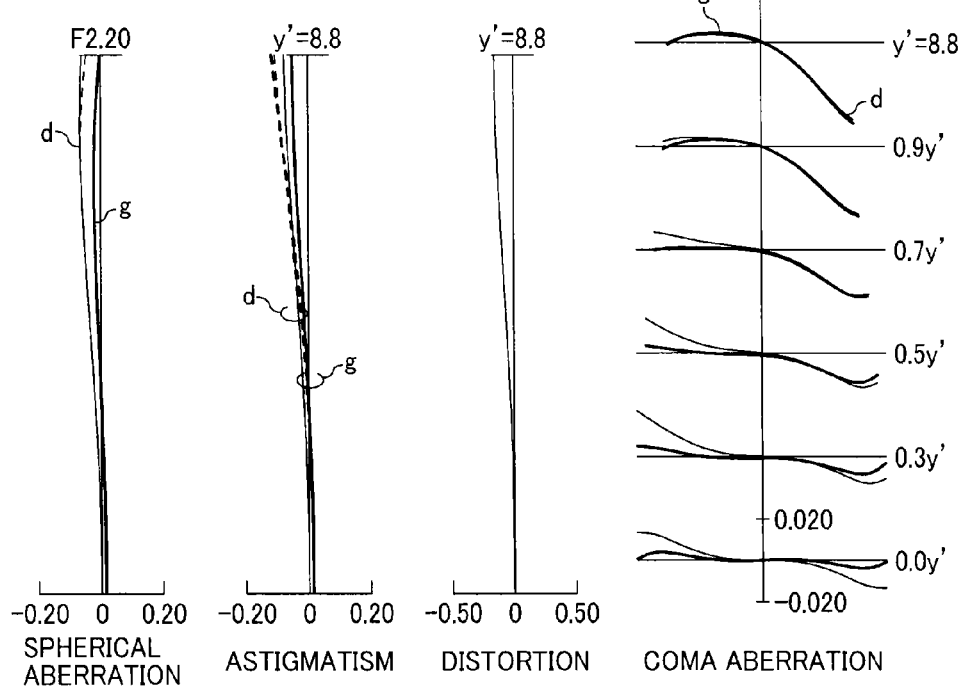
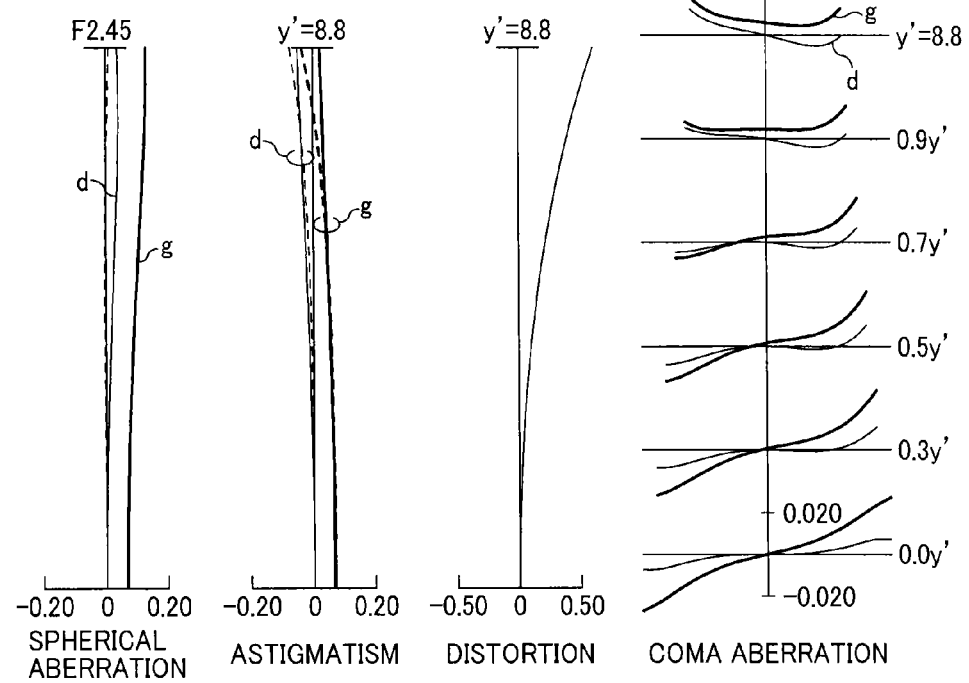

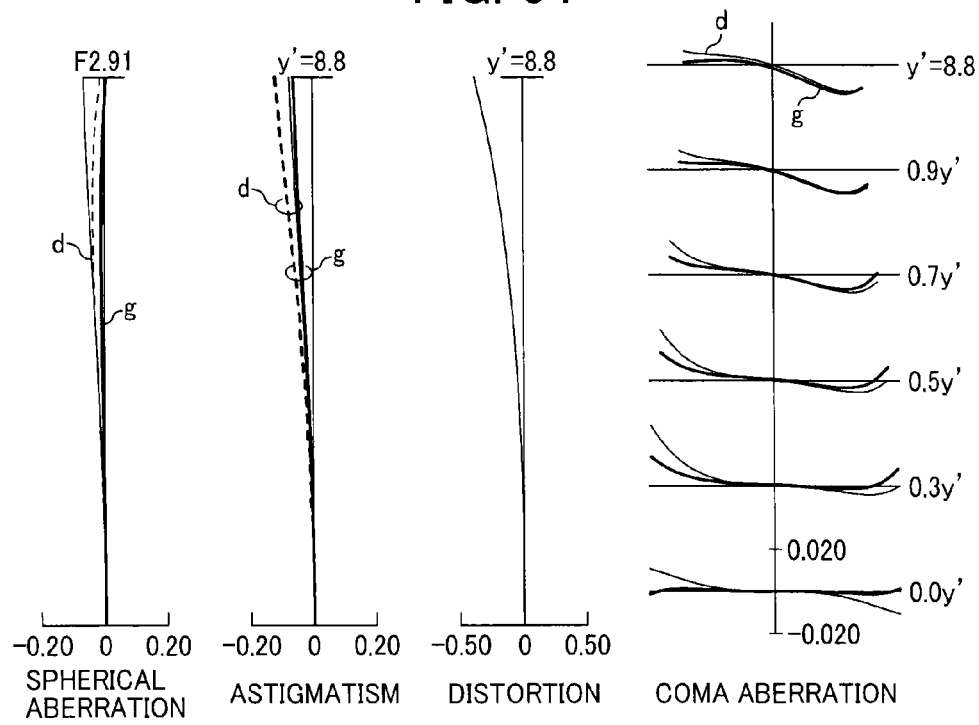
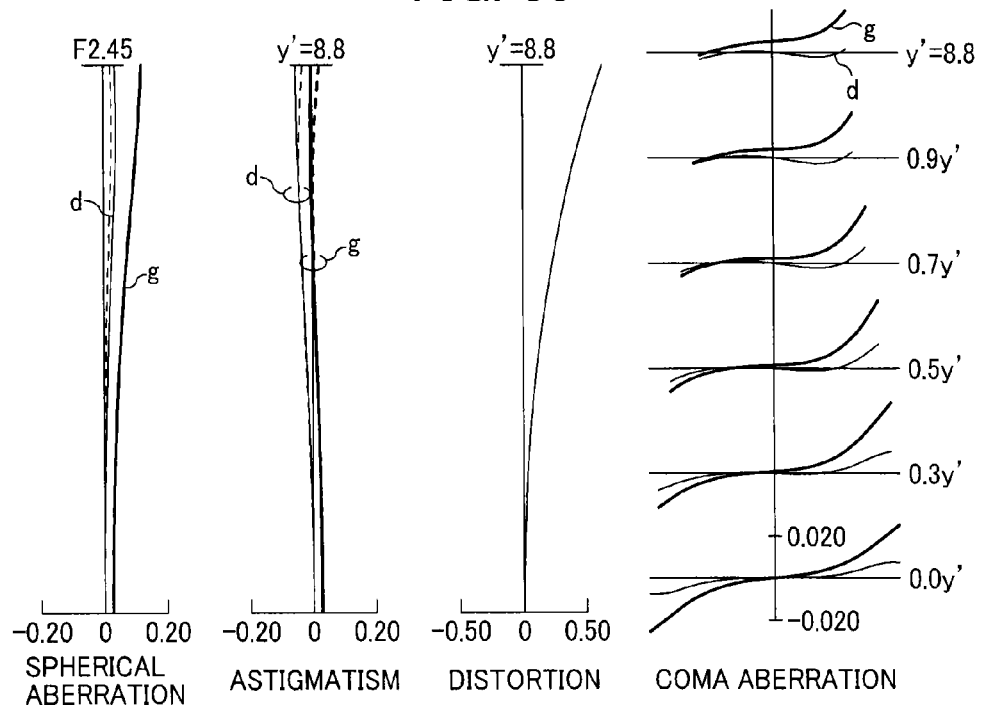

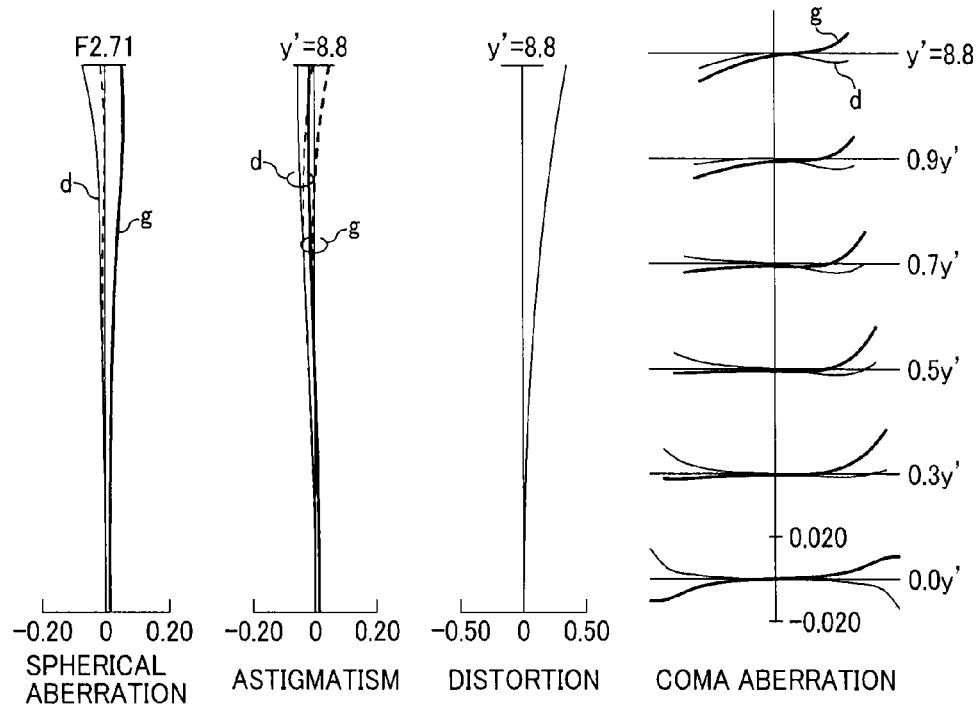
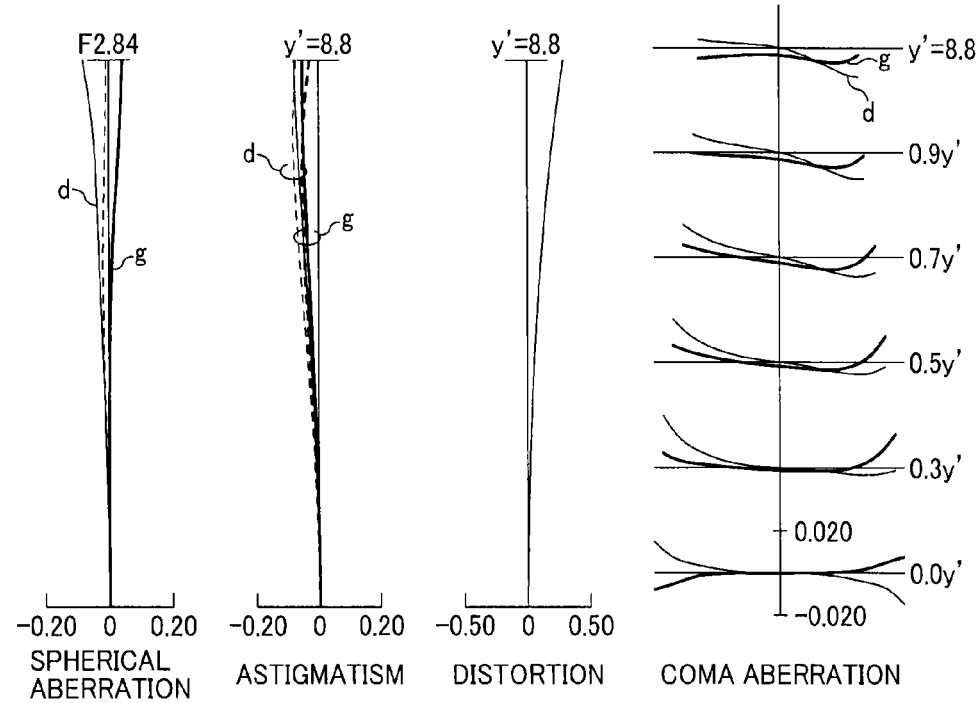

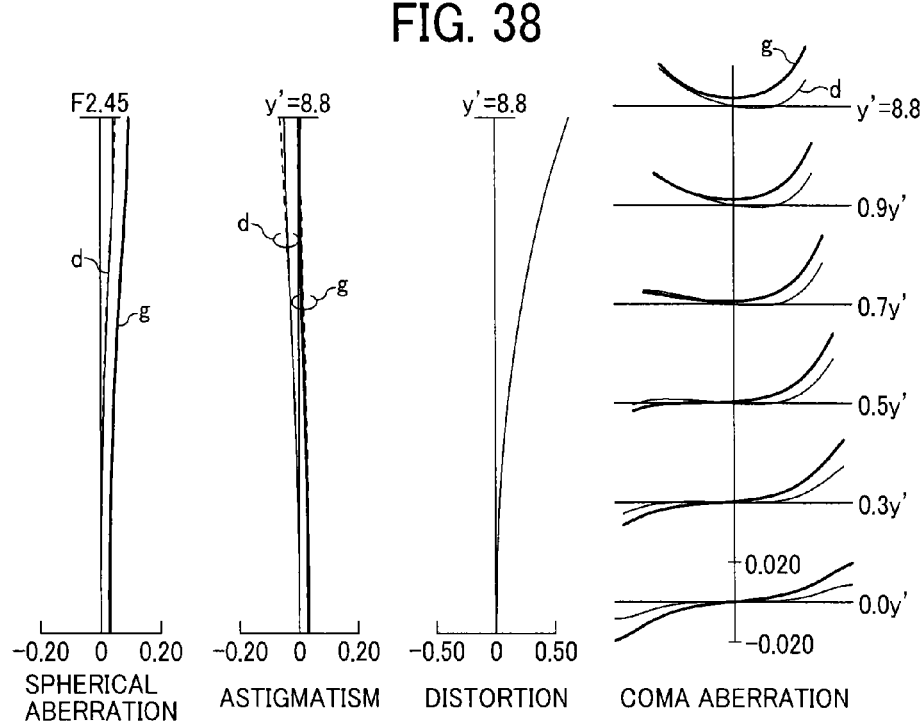
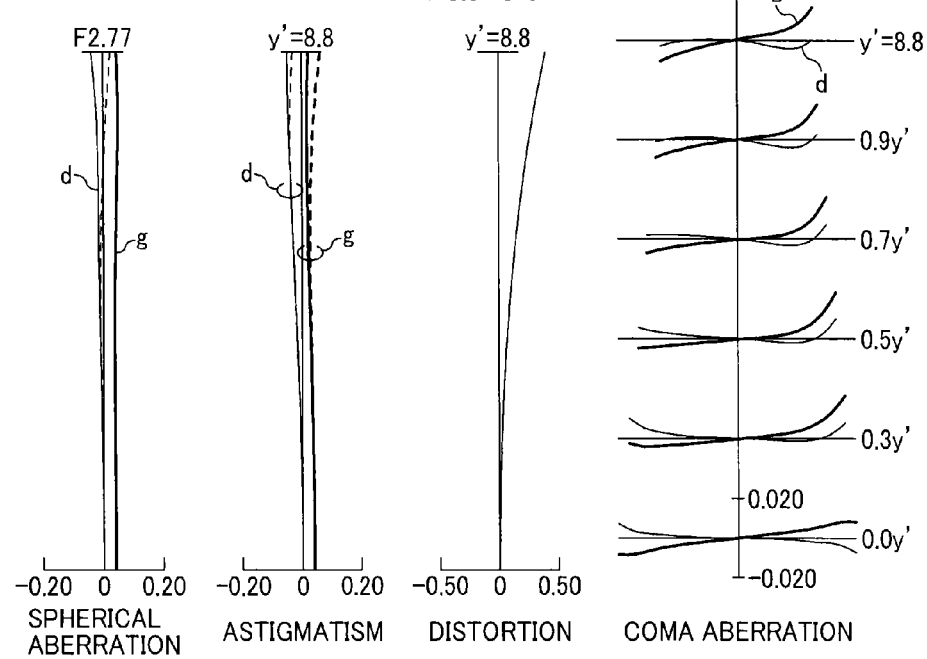

IMAGE FORMING LENS AND IMAGE CAPTURING DEVICE

CROSS-REFERENCE TO RELATED APPLICATIONS

This patent application is based on and claims priority pursuant to 35 U.S.C. §119(a) to Japanese Patent Applications Nos. 2014-189115, filed on Sep. 17, 2014, and 2014-189385, filed on Sep. 17, 2014 in the Japan Patent Office, the entire disclosure of which is hereby incorporated by reference herein.

BACKGROUND

Technical Field

The present invention relates to an image forming lens and an image capturing device.

Description of the Related Art

A so-called "industrial camera" is widely put into practical use, and for example, an image input device for machine vision, etc. are developed.

For an image forming lens used in the image input device for machine vision, it is important to have stable lens performance that is little varied due to focusing.

There is a known technology disclosed in JP-2013-218015-A as an optical system in which lens performance is suppressed from being varied due to focusing.

The optical system (lens system) disclosed in JP-2013-218015-A includes a first lens unit having positive refractive power and a second lens unit having positive or negative refractive power.

Further, the first lens unit is formed by sequentially arranging, from an object side to an image side, a lens unit 1a having positive refractive power, an aperture stop, and a lens unit 1b having positive refractive power, and focusing is performed from an infinite distance object to a short distance object by moving the first lens unit to the object side.

SUMMARY

An image forming lens is formed by sequentially arranging, from an object side to an image side, a first lens group having positive refractive power, an aperture stop, a second lens group having positive refractive power, and a third lens group having positive or negative refractive power. When focusing is performed from a long distance to a short distance, the third lens group is fixed relative to an image surface, and the first lens group, the aperture stop, and the second lens group are moved integrally to the object side. In the image forming lens, the third lens group is formed by sequentially arranging, from the object side to the image side, two lenses in order of a negative lens and a positive lens, and a conditional expression is satisfied:

$$0.20 < D/L_{3F\text{-}I} < 0.60,$$

where

D is an air space between the negative lens and the positive lens which form the third lens group, and $L_{3F\text{-}I}$ is a distance from an object-side surface of the negative lens of the third lens group to the image surface.

An image forming lens is formed by sequentially arranging, from an object side to an image side, a first lens group having positive refractive power, an aperture stop, a second lens group having positive refractive power, and a third lens group having positive or negative refractive power. When focusing is performed from a long distance to a short distance, the third lens group is fixed relative to an image surface, and the first lens group, the aperture stop, and the second lens group are moved integrally to the object side. In the image forming lens, the third lens group is formed by sequentially arranging, from the object side to the image side, two lenses in order of a negative lens and a positive lens, and a conditional expression is satisfied:

$$4.0 < D/L_{2G\text{-}3G} < 12.0,$$

where

D is an air space between the negative lens and the positive lens in the third lens group, and $L_{2G\text{-}3G}$ is a distance on an optical axis from a surface closest to the image side in the second lens group to a surface closest to the object side in the third lens group in a state that focusing is performed on an infinite distance object.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating aberrations of the image forming lens according to the first example of the first embodiment in a state that focusing is performed at a working distance of 0.2 m;

FIG. 9 is a diagram illustrating aberrations of the image forming lens according to the second example of the first embodiment in a state that focusing is performed on infinity;

FIG. 14 is a diagram illustrating aberrations of the image forming lens according to the third example of the first embodiment in a state that focusing is performed at a working distance of 0.2 m;

FIG. 15 is a diagram illustrating aberrations of the image forming lens according to the fourth example of the first embodiment in a state that focusing is performed on infinity;

FIG. 16 is a diagram illustrating aberrations of the image forming lens according to the fourth example of the first embodiment in a state that focusing is performed at a working distance of 0.3 m;

FIG. 17 is a diagram illustrating aberrations of the image forming lens according to the fourth example of the first embodiment in a state that focusing is performed at a working distance of 0.2 m;

FIG. 18 is a diagram illustrating aberrations of the image forming lens according to the fifth example of the first embodiment in a state that focusing is performed on infinity;

FIG. 19 is a diagram illustrating aberrations of the image forming lens according to the fifth example of the first embodiment in a state that focusing is performed at a working distance of 0.3 m;

FIG. 28 is a diagram illustrating aberrations of the image forming lens according to the first example of the second embodiment in a state that focusing is performed at a working distance of 0.15 m;

FIG. 29 is a diagram illustrating aberrations of the image forming lens according to the second example of the second embodiment in a state that focusing is performed on infinity;

FIG. 34 is a diagram illustrating aberrations of the image forming lens according to the third example of the second embodiment in a state that focusing is performed at a working distance of 0.2 m;

FIG. 35 is a diagram illustrating aberrations of the image forming lens according to the fourth example of the second embodiment in a state that focusing is performed on infinity;

FIG. 36 is a diagram illustrating aberrations of the image forming lens according to the fourth example of the second embodiment in a state that focusing is performed at a working distance of 0.3 m;

FIG. 37 is a diagram illustrating aberrations of the image forming lens according to the fourth example of the second embodiment in a state that focusing is performed at a working distance of 0.2 m;

FIG. 38 is a diagram illustrating aberrations of the image forming lens according to the fifth example of the second embodiment in a state that focusing is performed on infinity;

FIG. 39 is a diagram illustrating aberrations of the image forming lens according to the fifth example of the second embodiment in a state that focusing is performed at a working distance of 0.3 m;

Figure 1A:
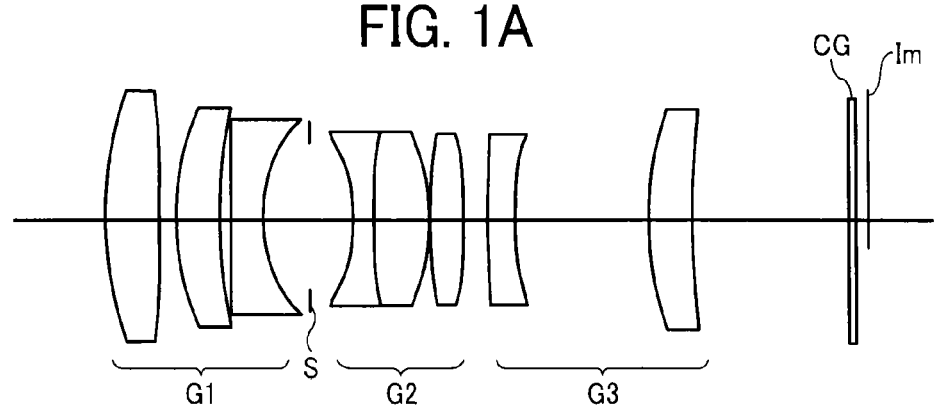
FIGS. 1A to 1C are diagrams illustrating an image forming lens according to a first example of a first embodiment.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

FIGS. 1A to 5C illustrate five examples of an image forming lenses according to a first embodiment. These working examples correspond to concrete first to fifth examples described later in this order.

In FIGS. 1A to 5C, a left side of the drawing is defined as an object side, and a right side of the drawing is defined as an image side.

In FIGS. 1A to 5C, an upper diagram (indicated by A) illustrates a lens configuration diagram "in a state that focusing is performed on infinity", a middle diagram (indicated by B) illustrates a lens configuration diagram "in a state that focusing is performed at an intermediate distance", and a lower diagram (indicated by C) illustrates a lens configuration diagram "in a state that focusing is performed at a short distance".

Note that same reference sings are used in FIGS. 1A to 5C to avoid complication.

In FIGS. 1A to 5C, a reference sign G1 indicates a "first lens group", a reference sign G2 a "second lens group", a reference sign G3 a "third lens group", and a reference sign S an "aperture stop" respectively.

Further, a reference sign Im indicates an "image surface".

The image forming lenses according to these working examples are assumed to be used in the case of capturing an image of a formed image with an image sensor, and a reference sign CG indicates a "cover glass of the image sensor" in FIGS. 1A to 5C.

The cover glass CG is formed like a "parallel flat plate", and a light receiving surface of the image sensor coincides with the image surface Im.

The cover glass CG has a function to shield and protect the light receiving surface of the image sensor, and simultaneously can have a function of an infrared cut filter and the like.

The first lens group G1 has positive refractive power, the second lens group G2 has positive refractive power, and the third lens group G3 has "positive or negative refractive power".

Therefore, the image forming lens illustrated in FIGS. 1A to 5C is formed by sequentially arranging, from the object side to the image side, the first lens group G1 having positive refractive power, an aperture stop S, the second lens group G2 having positive refractive power, and the third lens group G3 having positive or negative refractive power.

As illustrated in FIGS. 1A to 5C, the third lens group G3 is fixed relative to the image surface Im and the first lens group G1, aperture stop S, and second lens group G2 are integrally moved to the object side when "focusing is performed from a long distance (upper diagram) to a short distance (lower diagram)".

In other words, at the time of performing focusing, a positional relation between the third lens group G3 and the image surface Im is unchanged, and only a distance between the second lens group G2 and the third lens group G3 is changed.

The third lens group G3 is formed by sequentially arranging two lenses from the object side to the image side in order of a negative lens L31 and a positive lens L32.

The image forming lens according to the present embodiment satisfies a conditional expression (1):

$$0.20 < D/L_{3F\text{-}I} < 0.60 \tag{1},$$

where

D is an air space between the negative lens and the positive lens forming the third lens group, and $L_{3F\text{-}I}$ is a mechanical distance from an object-side surface of the negative lens in the third lens group to the image surface.

The "distance $L_{3F\text{-}I}$ from the object-side surface of the negative lens in the third lens group to the image surface" is the "distance from the object-side surface of the negative lens L31 in the third lens group G3 to the image surface Im", and a thickness of a cover glass CG present between an image-side surface of the positive lens L32 and the image surface Im is converted to air equivalent.

In other words, in the case of defining the distance from the image-side surface of the positive lens L32 in the third lens group to the image surface Im as a "backfocus", the distance converted to air equivalent is used as a "backfocus portion" included in the above distance $L_{3F\text{-}I}$.

The image forming lenses in the later-described concrete first to fifth examples corresponding to the working examples of the image forming lenses illustrated in FIGS. 1A to 5C also satisfy the conditional expression (1), of course.

The conditional expression (1) is a condition to effectively suppress "change of respective aberrations" due to focusing while correcting, with good balance, the respective aberrations of the image forming lens according to the present embodiment.

When a parameter of the conditional expression (1) is 0.20 or less, "change of a spherical aberration" due to focusing becomes excessively large, and performance cannot be sufficiently secured in a state that focusing is performed on an infinite side or a close side.

When the parameter of the conditional expression (1) is 0.60 or more, a lens system tends to be increased in size, and it is difficult to achieve both correction of the coma aberration and "downsizing of the image forming lens".

The "change of the respective aberrations" due to focusing can be more favorably suppressed by controlling the parameter "$D/L_{3F\text{-}I}$" in the conditional expression (1) with a following conditional expression (1A) slightly narrower than the conditional expression (1):

$$0.25 < D/L_{3F\text{-}I} < 0.50 \tag{1A}.$$

Preferably, the image forming lens according to the first embodiment satisfies any one or more of following conditional expressions (2) to (4) together with the above configuration:

$$0.15 < D/f < 0.40 \tag{2},$$

$$1.10 < f/f_{1\text{-}2} < 1.40 \tag{3, and}$$

$$-0.15 < (r_{3NR} - r_{3PF})/(r_{3NR} + r_{3PF}) < 0.05 \tag{4}.$$

The respective signs in parameters of the conditional expressions (2) to (4) are defined as follows.

"D" is an air space between the negative lens and the positive lens forming the third lens group, "f" is a focal length in the entire system in a state of focusing the image forming lens on an infinite distance object, and "$f_{1\text{-}2}$" is a composite focal length of the first lens group and the second lens group.

Further, "$r_{3NR}$" is a curvature radius of the image-side surface of negative lens in the third lens group, and "$r_{3PF}$" is a curvature radius of an object-side surface of the positive lens in the third lens group.

When a parameter of the conditional expression (2) is 0.15 or less, the change of the various kinds of aberrations due to focusing is hardly suppressed. In the case of 0.40 or more, it becomes difficult to achieve both correction of the coma aberration and downsizing of the image forming lens.

By satisfying the conditional expression (2), size increase of the image forming lens and the "change of the various kinds of aberrations due to focusing" can be more effectively suppressed.

A parameter in the conditional expression (3) relates to magnification of the third lens group.

When the parameter of the conditional expression (3) is 1.10 or less, the magnification of the third lens group is relatively small with respect to magnification of the entire system, and an amount of integral movement of the "first lens group, aperture stop, and second lens group" for focusing tends to be increased.

In the following, the "first lens group, aperture stop, and second lens group which are integrally moved at the time of focusing" is also referred to as a "movable group".

Due to the increase of the moving amount of the movable group, the image forming lens system including a "mechanism to displace the movable group (hereinafter also referred to as a "displacing mechanism")" tends to be increased in size to perform focusing.

When the parameter of the conditional expression (3) is 1.4 or more, the magnification of the third lens group is relatively large with respect to the magnification of the entire system, and an image aberration formed by the first lens group and the second lens group tends to be enlarged at the third lens group. Therefore, keeping good balance in correcting the various kinds of aberrations becomes difficult.

By satisfying the conditional expression (3), it becomes possible to perform focusing with a small extension amount of the movable group.

Therefore, size increase of the image forming lens system can be easily suppressed, and keeping good balance in correcting the various kinds of aberrations can be easily achieved.

The effects of the conditional expression (3), by which "size increase of the image forming lens system can be easily suppressed and keeping good balance in correcting the various kinds of aberrations can be easily achieved", can be more encouraged by making the parameter of the conditional expression (3) satisfy a following conditional expression (3A) slightly narrower than the conditional expression (3):

$$1.20 < f/f_{1-2} < 1.30 \qquad (3A).$$

When a parameter of the conditional expression (4) is −0.15 or less, a spherical aberration tends to be generated on an under side, and an inward coma aberration tends to be generated.

When the parameter of the conditional expression (4) is 0.05 or more, the spherical aberration tends to be generated on the over side, and an outward coma aberration tends to be generated.

Such tendency of generating the spherical aberration and coma aberration can be suppressed by satisfying the conditional expression (4).

The "effect of suppressing the spherical aberration and coma aberration" provided by the conditional expression (4) can be more encouraged by making the parameter of the conditional expression (4) satisfy a following conditional expression (4A) slightly narrower than the conditional expression (4):

$$-0.10 < (r_{3NR} - r_{3PF})/(r_{3NR} + r_{3PF}) < 0.00 \qquad (4A).$$

According to the image forming lens system of the present embodiment, the third lens group having positive or negative refractive power has a "two-lens configuration" formed by sequentially arranging the negative lens and the positive lens from the object side to the image side as described above.

The first lens group having positive refractive power may be formed of "three lenses by arranging, on the image side of two positive lenses, a negative lens having a concave surface oriented to the image side".

In this case, the second lens group having positive refractive power may be formed of "three lenses by arranging, on the object side of two positive lenses, a negative lens having a concave surface oriented to the object side" or formed of "four lenses by sequentially arranging, from the object side, a positive lens having a concave surface oriented to the object side and a negative lens on the object side of two positive lenses".

With this configuration, a so-called "Gaussian type", in which "arrangement of the first lens group, aperture stop, and second lens group" is symmetrical around the aperture stop, is formed, and the movable group can have a configuration in which "various kinds of aberrations are balanced with the minimal number of lenses in a compact state".

On the assumption that the "movable group" is thus configured, preferably, the image forming lens satisfies any one or more of following conditional expressions (5), (6) in addition to the conditional expression (1) or further in addition to any one of the conditional expressions (2) to (4):

$$1.20 < f_1/f_{1-2} < 4.00 \qquad (5), \text{ and}$$

$$-0.15 < (r_{1NR} + r_{2NF})/(r_{1NR} - r_{2NF}) < 0.05 \qquad (6).$$

Further, preferably, following three conditions are satisfied in addition to any one or more of the conditional expressions (5), (6):

$$1.58 < n_d < 1.63 \qquad (7),$$

$$62.0 < v_d < 70.0 \qquad (8), \text{ and}$$

$$0.004 < \theta_{g,F}(-0.001742 \times v_d + 0.6490) < 0.030 \qquad (9).$$

The respective signs in parameters of the conditional expressions (5) to (9) are defined as follows.

"$f_1$" is the focal length of the first lens group, and "$f_{1-2}$" is the composite focal length of the first lens group and the second lens group.

Further, "$r_{1NR}$" is the curvature radius of the image-side surface of the negative lens in the first lens group, and "$r_{2NF}$" is a curvature radius of an object-side surface of the negative lens in the second lens group.

The parameters "$n_d$", "$v_d$", and "$\theta_{g,F}$" in the conditional expressions (7) to (9) respectively indicate a refractive index, an Abbe's number, and a partial dispersion ratio of material quality of a "positive lens disposed closest to the object side" in the first lens group.

The "partial dispersion ratio $\theta_{g,F}$" is defined by the refractive indexes $n_g$, $n_F$, $n_C$ with respect to g line, F line, C line of the lens material as a following expression:

$$\theta_{g,F} = (n_g - n_F)/(n_F - n_C).$$

The conditional expression (5) is a condition to provide a "good relation of refractive power" between the first lens group and the second lens group formed in the Gaussian type with the aperture stop.

When a parameter of the conditional expression (5) is 1.20 or less, the refractive power of the first lens group becomes relatively excessively large with respect to the refractive power of the second lens group, and in the case of 4.00 or more, the refractive power of the first lens group becomes relatively excessively small.

In any cases, a coma aberration and distortion tend to be generated at the "movable group" when the parameter is out of a range of the conditional expression (5).

The coma aberration and distortion can be favorably suppressed from being generated at the movable group by satisfying the conditional expression (5).

The effect of "suppressing generation of the coma aberration and distortion at the movable group" of the conditional expression (5) can be more encouraged by making the parameter of the conditional expression (5) satisfy a following conditional expression (5A) slightly narrower than the conditional expression (5):

$1.50 < f_1/f_{1-2} < 3.00$ (5A).

"More favorably correcting" the coma aberration can be achieved by making the parameter of the conditional expression (6) within a range of the conditional expression (6).

"More favorably correcting a chromatic aberration" can be achieved by forming the positive lens of the first lens group with material having a dispersion property and satisfying the conditional expressions (7), (8), and (9).

The image forming lens may, of course, adopt one or more of special surfaces such as an aspheric surface and a diffractive surface, but all of the lens surfaces may also be formed of spherical surfaces as well.

When the special surfaces such as the aspheric surface and the diffractive surface are not adopted, "high manufacturing cost" spent for a die for molding can be saved, for example, and particularly, it is economically advantageous at the time of small-lot production.

Further, preferably, all of respective lens components constituting the image forming lens are made of "inorganic solid material". The lens made of organic material, organic-inorganic hybrid material, etc. has a property largely varied by environmental conditions such as temperature and humidity.

When all of the lenses constituting the image forming lens are made of the "inorganic solid material", the image forming lens hardly receiving influence from change of the environmental conditions such as temperature and humidity can be provided.

EXAMPLES

In the following, the first to fifth examples will be described as concrete examples of the image forming lenses according to the working examples illustrated in FIGS. 1A to 5C.

The image forming lenses in the first to fifth examples are assumed to be used in an image input device for machine vision, and are almost telescopic lenses in which a working distance can be easily secured and perspective influence is hardly received.

The "working distance" is an operating distance and is a distance between an end of the lens and an object surface of a target to be imaged for image inputting (also referred to as a "work").

The image forming lenses in these examples are configured to have a half field angle of nearly 10 degrees and an F number of about 2.4.

As illustrated in FIGS. 1A to 5C, the image forming lens is formed by sequentially arranging the first lens group G1, aperture stop S, second lens group G2, and third lens group G3 from the object side to the image side.

The first lens group G1 is formed by sequentially arranging three lenses from the object side to the image side in order of a positive lens L11, a positive lens L12, and a negative lens L13.

The second lens group G2 disposed on the image side of the aperture stop S is formed by sequentially arranging, from the object side to the image side, three lenses in order of a negative lens L21, a positive lens L22, and a positive lens L23, or four lenses in order of a positive lens L21A, a negative lens L21B, a positive lens L22, and a positive lens L23.

The third lens group G3 is formed by sequentially arranging the negative lens L31 and positive lens L32 from the object side to the image side as described above.

When focusing is performed from a long distance to a short distance, the third lens group G3 is fixed relative to the image surface Im, and the first lens group G1, aperture stop S, and second lens group G2 are integrally moved to the object side.

In all of the first to fifth examples, a "maximum image height is 8.8 mm".

In the respective examples, the cover glass CG having the form of the parallel flat plate disposed on an image surface side of the third lens group G3 is arranged such that an image-side surface thereof is located at a position about 1.0 mm from the image surface Im on the object side, but not limited thereto, of course.

In all of the first to fifth examples, "a close distance of the image forming lens up to the object surface of the work is set at 0.2 m as the working distance", and a photographing magnification in this case is approximately 0.25 times or more.

The reference signs in the respective examples are defined as follows.

f: focal length in entire system
F: F number
ω: half field angle (half field angle in a state that focusing is performed on infinity)
R: curvature radius
D: distance between surfaces
$N_d$: refractive index
$v_d$: Abbe's number
$θ_{g,F}$: partial dispersion ratio
W. D: working distance (distance from the object to the object-side surface of the positive lens L11)

Note that the unit of a length dimension is "mm", unless otherwise specifically noted.

Figure 1B:
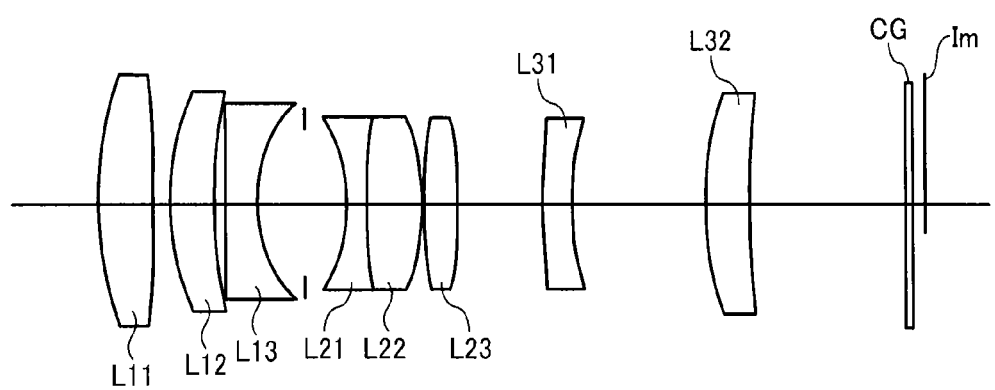
Figure 1C:
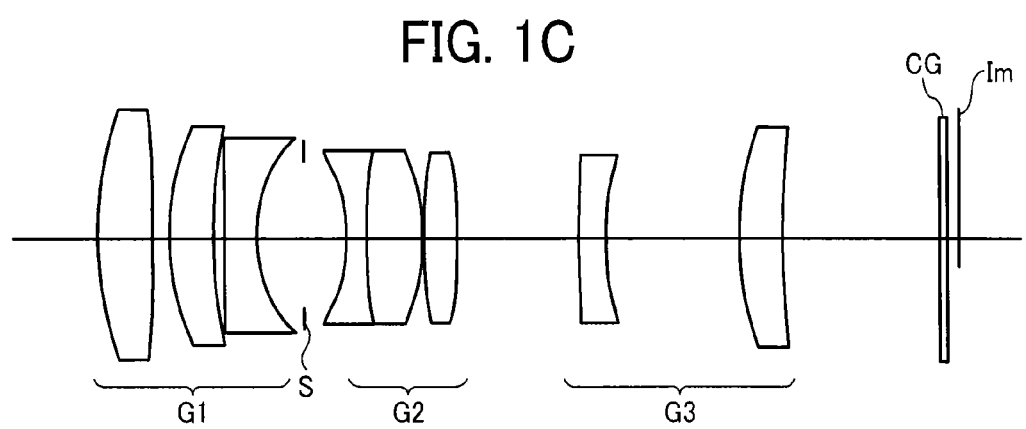

The first example described first is a concrete example of the image forming lens illustrated in FIGS. 1A to 1C.

First Example f = 50.01, F = 2.45, ω = 9.92

| Surface No. | R | D | $N_d$ | $v_d$ | $θ_{g,F}$ | Glass Type |
|---|---|---|---|---|---|---|
| 01 | 29.180 | 5.00 | 1.61800 | 63.33 | 0.5441 | OHARA S-PHM52 |
| 02 | −157.009 | 1.51 | | | | |
| 03 | 22.556 | 4.00 | 1.74320 | 49.34 | 0.5531 | OHARA S-LAM60 |
| 04 | 41.995 | 0.86 | | | | |
| 05 | ∞ | 3.00 | 1.56732 | 42.82 | 0.5731 | OHARA S-TIL26 |
| 06 | 12.234 | 4.30 | | | | |
| 07 | stop | 3.91 | | | | |
| 08 | −13.328 | 1.80 | 1.63980 | 34.47 | 0.5922 | OHARA S-TIM27 |
| 09 | 52.924 | 5.00 | 1.71300 | 53.87 | 0.5459 | OHARA S-LAL8 |
| 10 | −19.474 | 0.20 | | | | |
| 11 | 55.227 | 3.00 | 1.65100 | 56.16 | 0.5482 | OHARA S-LAL54 |
| 12 | −37.986 | variable distance (A) | | | | |
| 13 | 71.849 | 2.50 | 1.83400 | 37.16 | 0.5776 | OHARA S-LAH60 |

-continued

| f = 50.01, F = 2.45, ω = 9.92 | | | | | | |
|---|---|---|---|---|---|---|
| 14 | 23.849 | 11.95 | | | | |
| 15 | 28.463 | 4.00 | 1.68893 | 31.07 | 0.6004 | OHARA S-TIM28 |
| 16 | 100.559 | 14.036 | | | | |
| 17 | ∞ | 0.75 | 1.51633 | 64.14 | | cover glass |
| 18 | ∞ | | | | | |

In the above data, "stop" indicates the "aperture stop", of course.

<Variable Distance (A)>

| W. D | Infinity | 0.3 m | 0.2 m |
|---|---|---|---|
| A | 2.000 | 7.566 | 10.550 |

<Parameter Values in Conditional Expressions>

Figure 6:
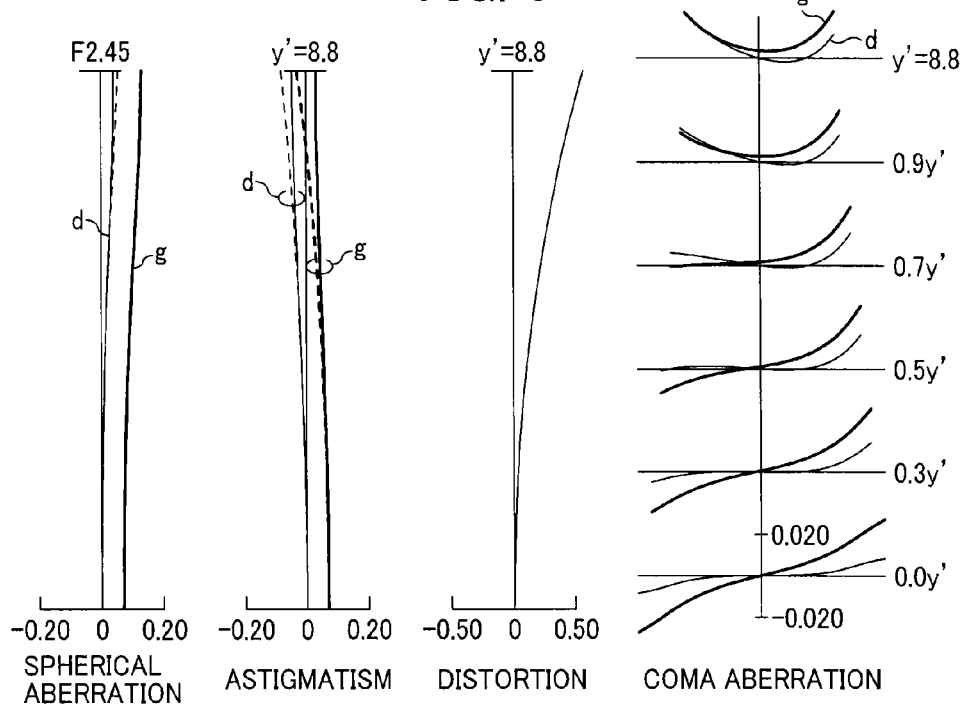
FIG. 6 is a diagram illustrating aberrations of the image forming lens according to the first example of the first embodiment in a state that focusing is performed on infinity.

(1) $D/L_{3F-1} = 0.352$
(2) $D/f = 0.239$
(3) $f/f_{1-2} = 1.25$
(4) $(r_{3NR} - r_{3PF})/(r_{3NR} + r_{3PF}) = -0.0882$
(5) $f_1/f_{1-2} = 1.96$
(6) $(r_{1NR} + r_{2NF})/(r_{1NR} - r_{2NF}) = -0.0428$
(7) $n_d = 1.61800$
(8) $v_d = 63.33$
(9) $\theta_{g,F} - (-0.001742 \times v_d + 0.6490) = 0.0055$ FIG. 6 is a diagram illustrating aberrations of the image forming lens according to the first example "in a state that focusing is performed on infinity".

Figure 7:
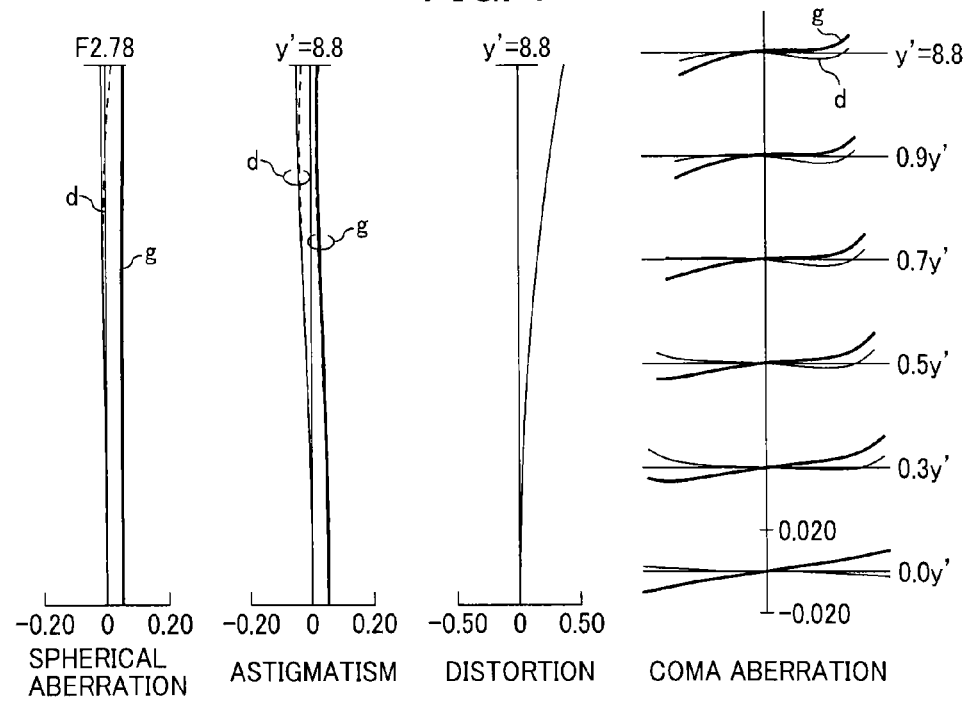
FIG. 7 is a diagram illustrating aberrations of the image forming lens according to the first example of the first embodiment in a state that focusing is performed at a working distance of 0.3 m.

FIG. 7 is a diagram illustrating aberrations of the image forming lens according to the first example "in a state that focusing is performed at a working distance of 0.3 m".

FIG. 8 is a diagram illustrating aberrations of the image forming lens according to the first example "in a state that focusing is performed at a working distance of 0.2 m".

In these diagrams of aberrations, dashed lines in the spherical aberration diagrams indicate "sine conditions", and in the diagrams of astigmatism, solid lines indicate "sagittal" and dashed lines indicate "meridional". Further, "d" indicates the d line, and "g" indicates the g line. The same is also applied to second to fifth examples in the following.

Figure 2A:
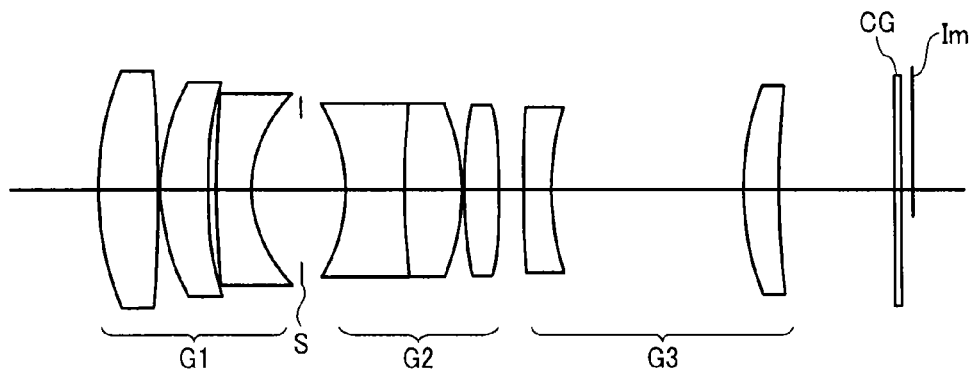
FIGS. 2A to 2C are diagrams illustrating an image forming lens according to a second example of the first embodiment.
Figure 2B:
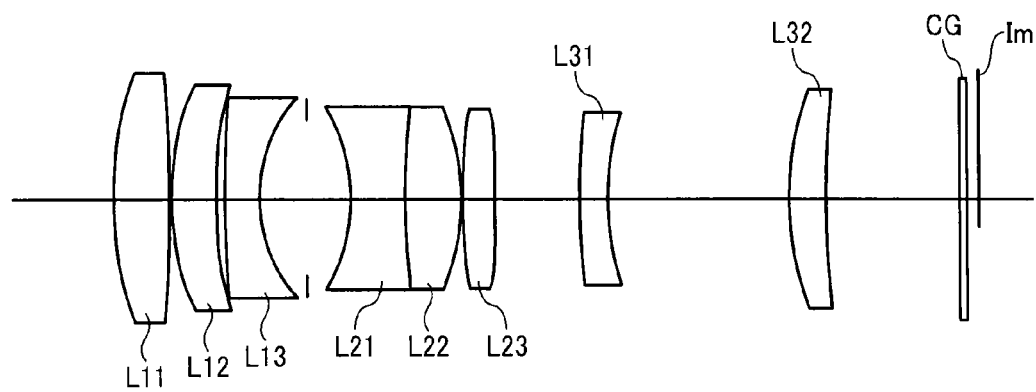
Figure 2C:
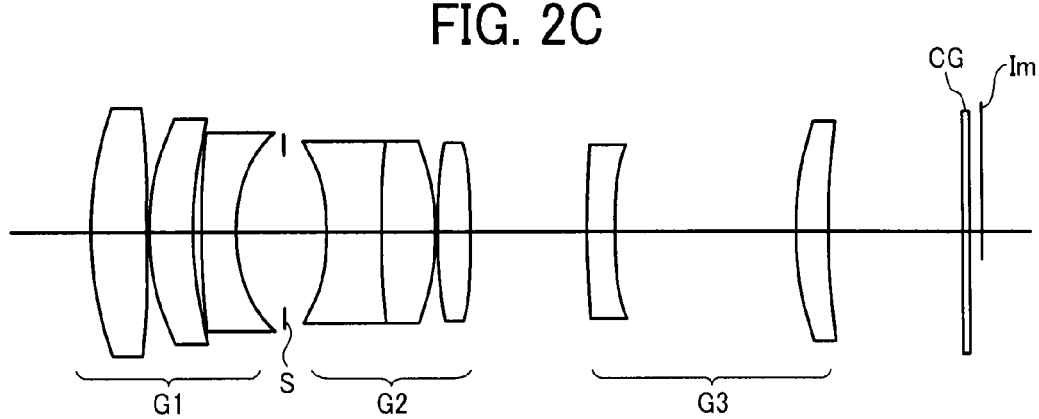

The second example described next is a concrete example of the image forming lens illustrated in FIGS. 2A to 2C.

Second Example

| f = 50.00, F = 2.45, ω = 9.92 | | | | | | |
|---|---|---|---|---|---|---|
| Surface No. | R | D | $N_d$ | $v_d$ | $\theta_{g,F}$ | Glass Type |
| 01 | 32.061 | 5.00 | 1.61800 | 63.33 | 0.5441 | OHARA S-PHM52 |
| 02 | −139.329 | 0.20 | | | | |
| 03 | 21.428 | 4.00 | 1.74320 | 49.34 | 0.5531 | OHARA S-LAM60 |
| 04 | 37.150 | 0.73 | | | | |
| 05 | 116.366 | 3.00 | 1.56732 | 42.82 | 0.5731 | OHARA S-TIL26 |
| 06 | 12.500 | 4.30 | | | | |
| 07 | stop | 3.90 | | | | |
| 08 | −14.500 | 5.00 | 1.67270 | 32.10 | 0.5988 | OHARA S-TIM25 |
| 09 | 73.560 | 5.00 | 1.65100 | 56.16 | 0.5482 | OHARA S-LAL54 |
| 10 | −20.097 | 0.20 | | | | |

-continued

| f = 50.00, F = 2.45, ω = 9.92 | | | | | | |
|---|---|---|---|---|---|---|
| 11 | 53.722 | 3.00 | 1.71300 | 53.87 | 0.5459 | OHARA S-LAL8 |
| 12 | −51.528 | variable distance (A) | | | | |
| 13 | 85.541 | 2.50 | 1.62230 | 53.17 | 0.5542 | OHARA S-BSM22 |
| 14 | 25.940 | 16.24 | | | | |
| 15 | 27.554 | 2.96 | 1.58144 | 40.75 | 0.5774 | OHARA S-TIL25 |
| 16 | 68.446 | 12.226 | | | | |
| 17 | ∞ | 0.75 | 1.51633 | 64.14 | | cover glass |
| 18 | ∞ | | | | | |

<Variable Distance (A)>

| W. D | Infinity | 0.3 m | 0.2 m |
|---|---|---|---|
| A | 1.900 | 7.493 | 10.450 |

<Parameter Values in Conditional Expressions>

Figure 10:
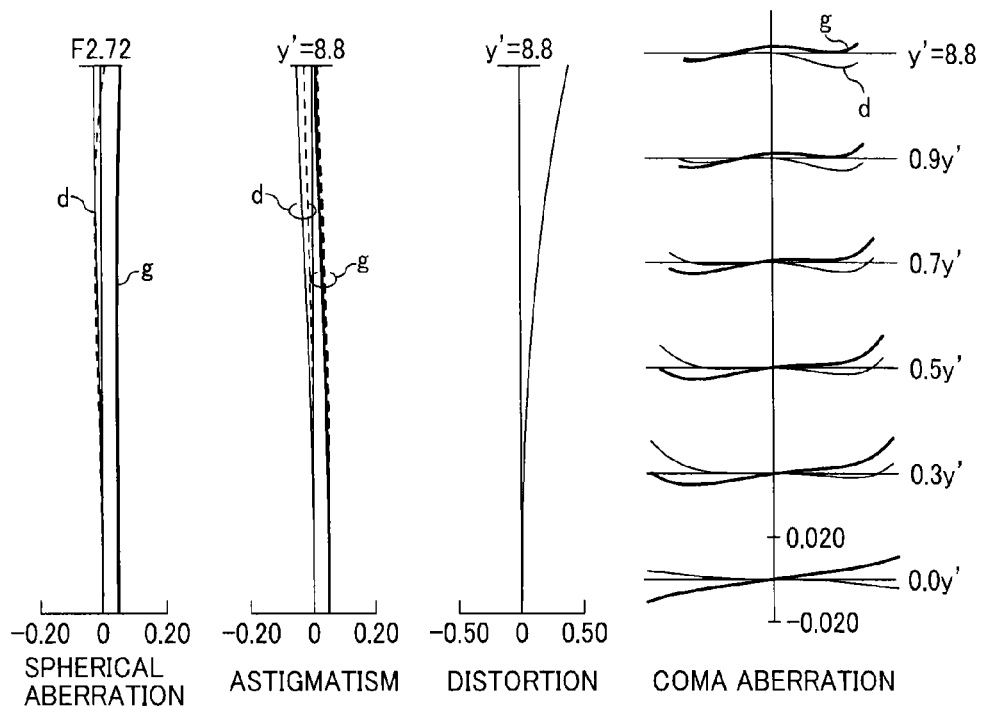
FIG. 10 is a diagram illustrating aberrations of the image forming lens according to the second example of the first embodiment in a state that focusing is performed at a working distance of 0.3 m.
Figure 11:
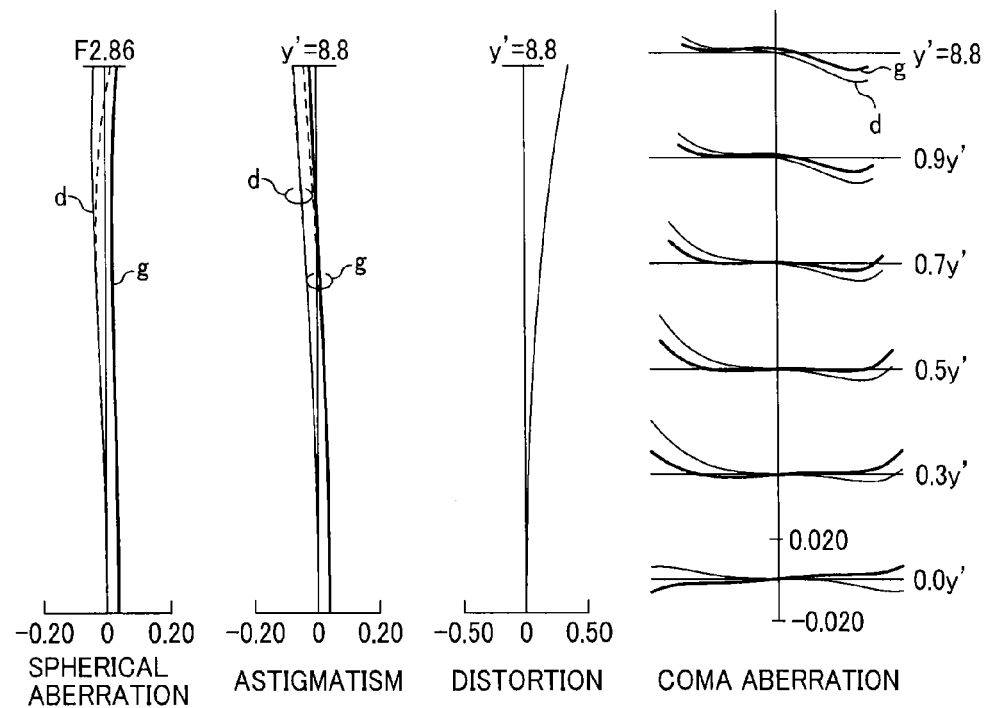
FIG. 11 is a diagram illustrating aberrations of the image forming lens according to the second example of the first embodiment in a state that focusing is performed at a working distance of 0.2 m.

(1) $D/L_{3F-1} = 0.458$
(2) $D/f = 0.325$
(3) $f/f_{1-2} = 1.24$
(4) $(r_{3NR} - r_{3PF})/(r_{3NR} + r_{3PF}) = -0.0302$
(5) $f_1/f_{1-2} = 2.07$
(6) $(r_{1NR} + r_{2NF})/(r_{1NR} - r_{2NF}) = -0.0741$
(7) $n_d = 1.61800$
(8) $v_d = 63.33$
(9) $\theta_{g,F} - (-0.001742 \times v_d + 0.6490) = 0.0055$ FIGS. 9 to 11 are diagrams illustrating aberrations of the image forming lens according to the second example in the same manner as FIGS. 6 to 8.

Figure 3A:
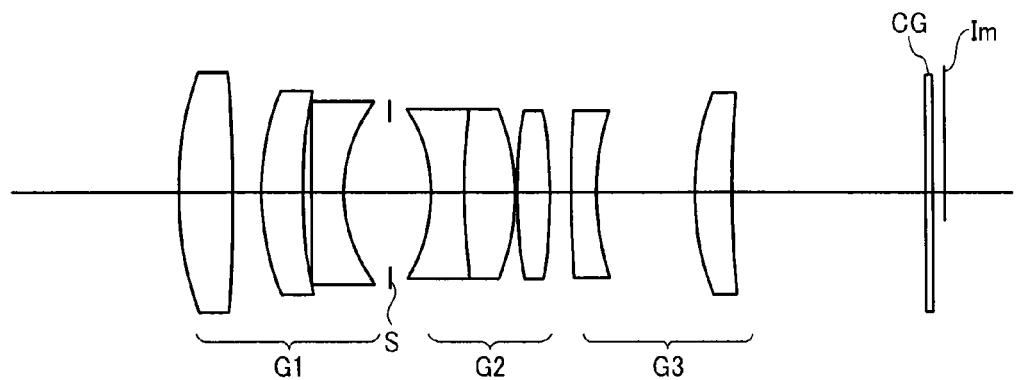
FIGS. 3A to 3C are diagrams illustrating an image forming lens according to a third example of the first embodiment.
Figure 3B:
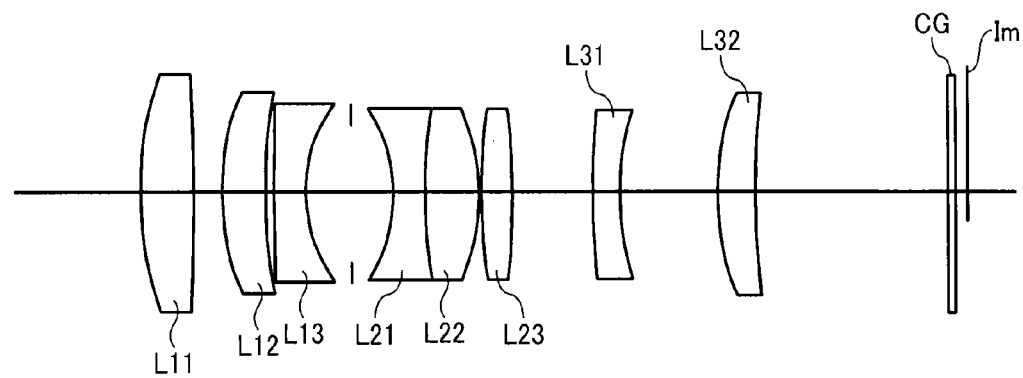
Figure 3C:
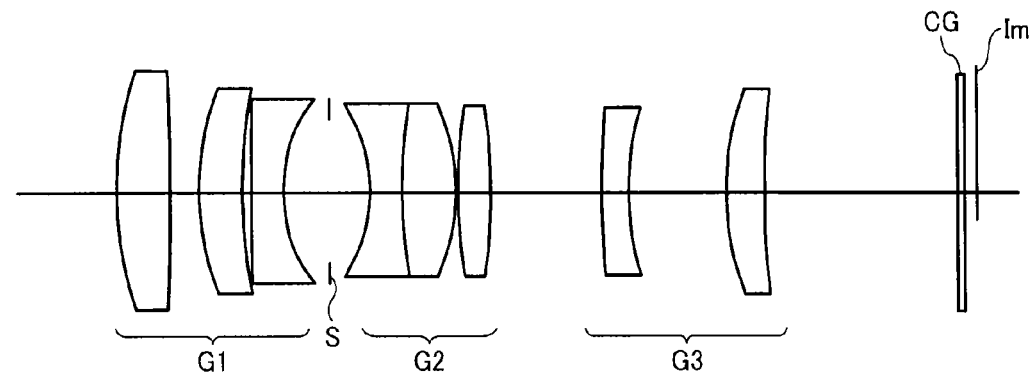

The third example described next is a concrete example of the image forming lens illustrated in FIGS. 3A to 3C.

Third Example

| f = 50.00, F = 2.45, ω = 9.99 | | | | | | |
|---|---|---|---|---|---|---|
| Surface No. | R | D | $N_d$ | $v_d$ | $\theta_{g,F}$ | Glass Type |
| 01 | 32.264 | 5.00 | 1.61800 | 63.33 | 0.5441 | OHARA S-PHM52 |
| 02 | −177.652 | 2.61 | | | | |
| 03 | 23.418 | 4.00 | 1.78590 | 44.20 | 0.5631 | OHARA S-LAH51 |
| 04 | 45.843 | 0.77 | | | | |
| 05 | 1630.890 | 3.00 | 1.60342 | 38.03 | 0.5835 | OHARA S-TIM5 |
| 06 | 13.278 | 4.30 | | | | |
| 07 | stop | 3.90 | | | | |
| 08 | −13.780 | 3.00 | 1.62004 | 36.26 | 0.5879 | OHARA S-TIM2 |
| 09 | 44.673 | 5.00 | 1.65100 | 56.16 | 0.5482 | OHARA S-LAL54 |
| 10 | −18.393 | 0.20 | | | | |
| 11 | 47.326 | 3.00 | 1.71300 | 53.87 | 0.5459 | OHARA S-LAL8 |
| 12 | −58.035 | variable distance (A) | | | | |
| 13 | 69.224 | 2.50 | 1.80610 | 40.93 | 0.5701 | OHARA S-LAH53 |
| 14 | 22.797 | 9.05 | | | | |
| 15 | 25.136 | 3.50 | 1.59551 | 39.24 | 0.5803 | OHARA S-TIM8 |

-continued

| f = 50.00, F = 2.45, ω = 9.99 | | | | |
|---|---|---|---|---|
| 16 | 87.309 | 17.956 | | |
| 17 | ∞ | 0.75 | 1.51633 64.14 | cover glass |
| 18 | ∞ | | | |

<Variable Distance (A)>

| W. D | Infinity | 0.3 m | 0.2 m |
|---|---|---|---|
| A | 1.900 | 7.517 | 10.475 |

<Parameter Values in Conditional Expressions>

Figure 12:
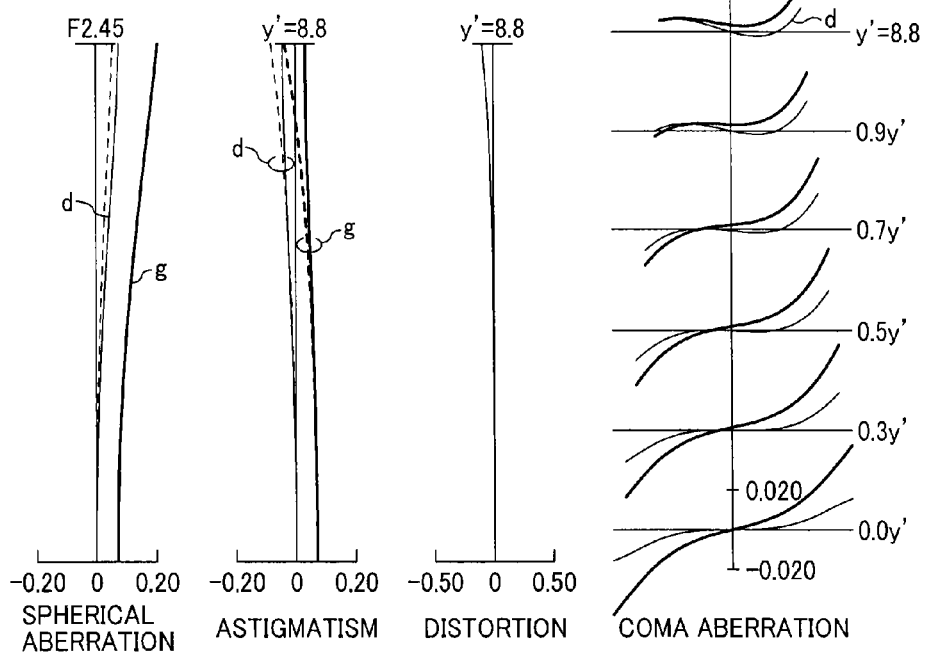
FIG. 12 is a diagram illustrating aberrations of the image forming lens according to the third example of the first embodiment in a state that focusing is performed on infinity.
Figure 13:
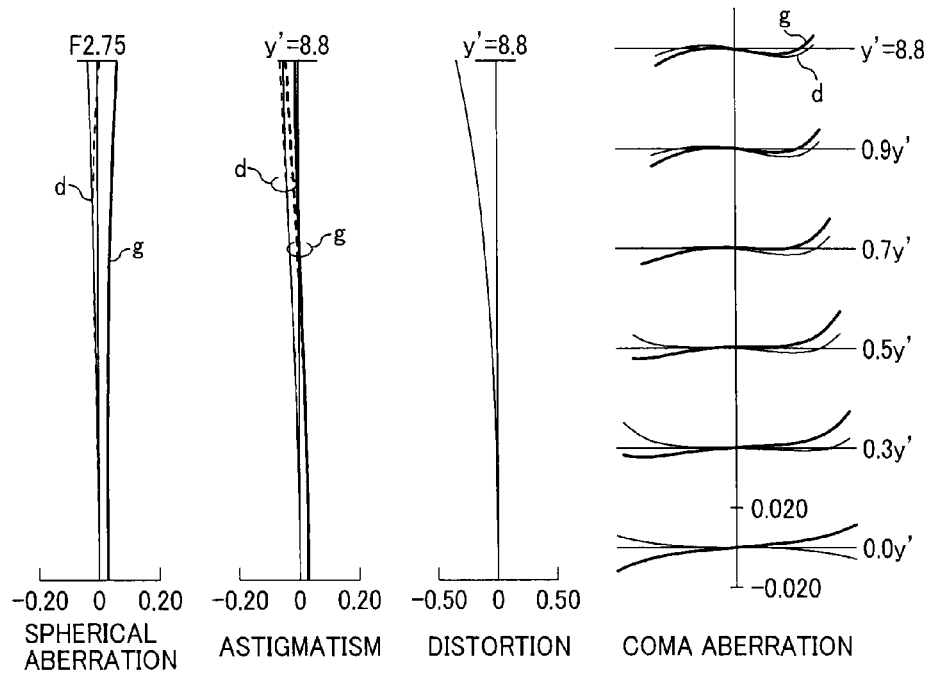
FIG. 13 is a diagram illustrating aberrations of the image forming lens according to the third example of the first embodiment in a state that focusing is performed at a working distance of 0.3 m.

(1) $D/L_{3F-1} = 0.262$
(2) $D/f = 0.181$
(3) $f/f_{1-2} = 1.24$
(4) $(r_{3NR} - r_{3PF})/(r_{3NR} + r_{3PF}) = -0.0488$
(5) $f_1/f_{1-2} = 1.81$
(6) $(r_{1NR} + r_{2NF})/(r_{1NR} - r_{2NF}) = -0.0186$
(7) $n_d = 1.61800$
(8) $v_d = 63.33$
(9) $\theta_{g,F} - (-0.001742 \times v_d + 0.6490) = 0.0055$ FIGS. 12 to 14 are diagrams illustrating aberrations of the image forming lens according to the third example in the same manner as FIGS. 6 to 8.

Figure 4A:
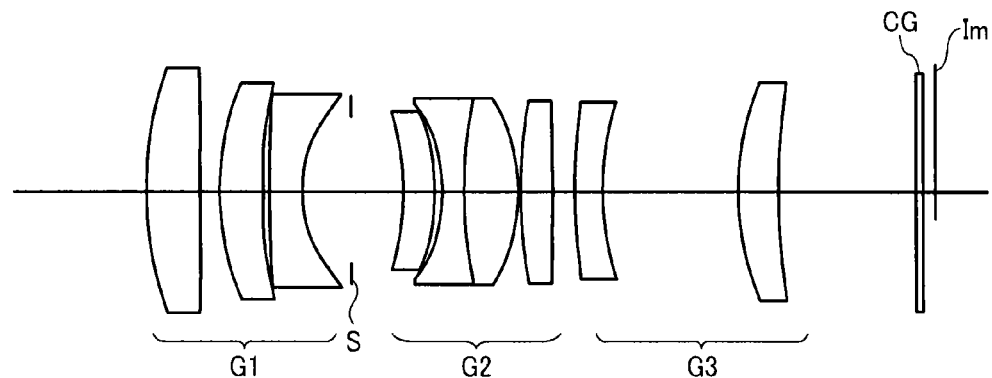
FIGS. 4A to 4C are diagrams illustrating an image forming lens according to a fourth example of the first embodiment.
Figure 4B:
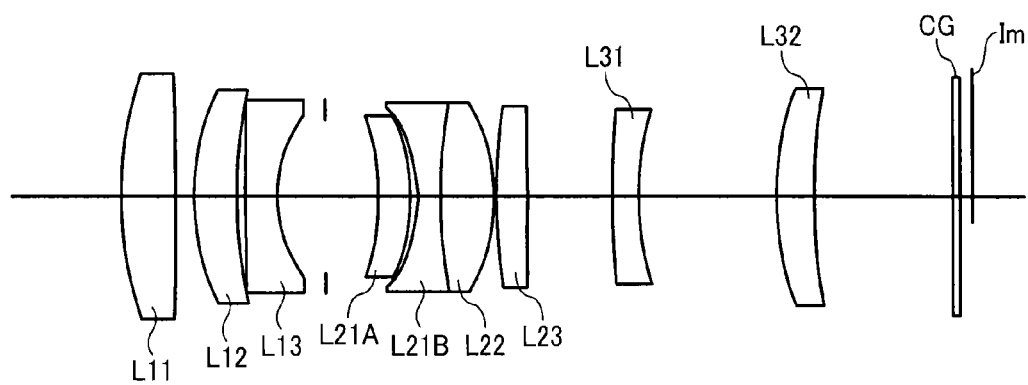
Figure 4C:
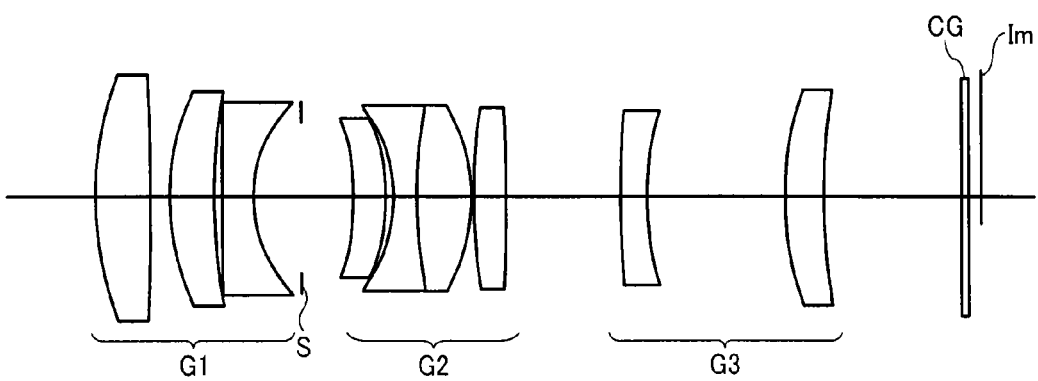

The fourth example described next is a concrete example of the image forming lens illustrated in FIGS. 4A to 4C.

Fourth Example

| f = 50.00, F = 2.45, ω = 9.92 | | | | | | |
|---|---|---|---|---|---|---|
| Surface No. | R | D | $N_d$ | $v_d$ | $\theta_{g,F}$ | Glass Type |
| 01 | 30.592 | 5.00 | 1.61800 | 63.33 | 0.5441 | OHARA S-PHM52 |
| 02 | -386.855 | 1.63 | | | | |
| 03 | 21.275 | 4.00 | 1.78590 | 44.20 | 0.5631 | OHARA S-LAH51 |
| 04 | 44.410 | 0.59 | | | | |
| 05 | 118.176 | 3.00 | 1.60342 | 38.03 | 0.5835 | OHARA S-TIM5 |
| 06 | 11.488 | 4.30 | | | | |
| 07 | stop | 4.73 | | | | |
| 08 | -22.114 | 3.00 | 1.48749 | 70.24 | 0.5300 | OHARA S-FSL5 |
| 09 | -16.612 | 0.66 | | | | |
| 10 | -12.075 | 2.00 | 1.60342 | 38.03 | 0.5835 | OHARA S-TIM5 |
| 11 | 38.763 | 5.00 | 1.65100 | 56.16 | 0.5482 | OHARA S-LAL54 |
| 12 | -15.623 | 0.20 | | | | |
| 13 | 44.789 | 3.00 | 1.71300 | 53.87 | 0.5459 | OHARA S-LAL8 |
| 14 | -235.889 | variable distance (A) | | | | |
| 15 | 66.771 | 2.50 | 1.80610 | 40.93 | 0.5701 | OHARA S-LAH53 |
| 16 | 24.406 | 12.38 | | | | |
| 17 | 26.340 | 3.50 | 1.69895 | 30.13 | 0.6030 | OHARA S-TIM35 |

-continued

| f = 50.00, F = 2.45, ω = 9.92 | | | | |
|---|---|---|---|---|
| 18 | 60.579 | 12.322 | | |
| 19 | ∞ | 0.75 | 1.51633 64.14 | cover glass |
| 20 | ∞ | | | |

<Variable Distance (A)>

| W. D | Infinity | 0.3 m | 0.2 m |
|---|---|---|---|
| A | 1.900 | 7.525 | 10.445 |

<Parameter Values in Conditional Expressions>

(1) $D/L_{3F-1} = 0.385$
(2) $D/f = 0.248$
(3) $f/f_{1-2} = 1.23$
(4) $(r_{3NR} - r_{3PF})/(r_{3NR} + r_{3PF}) = -0.0381$
(5) $f_1/f_{1-2} = 2.49$
(6) $(r_{1NR} + r_{2NF})/(r_{1NR} - r_{2NF}) = -0.0249$
(7) $n_d = 1.61800$
(8) $v_d = 63.33$
(9) $\theta_{g,F} - (-0.001742 \times v_d + 0.6490) = 0.0055$ Note that the fourth example is an example of forming the second lens group with the "four lenses including a positive lens L21A, a negative lens L21B, the positive lens L22, and the positive lens L23".

In the parameter of the conditional expression (6), "$r_{2NF}$" is a surface of a surface number 10 (an image-side surface of the negative lens L21B is cemented with the object-side surface of the positive lens L22).

FIGS. 15 to 17 are diagrams illustrating aberrations of the image forming lens according to the fourth example in the same manner as FIGS. 6 to 8.

Figure 5A:
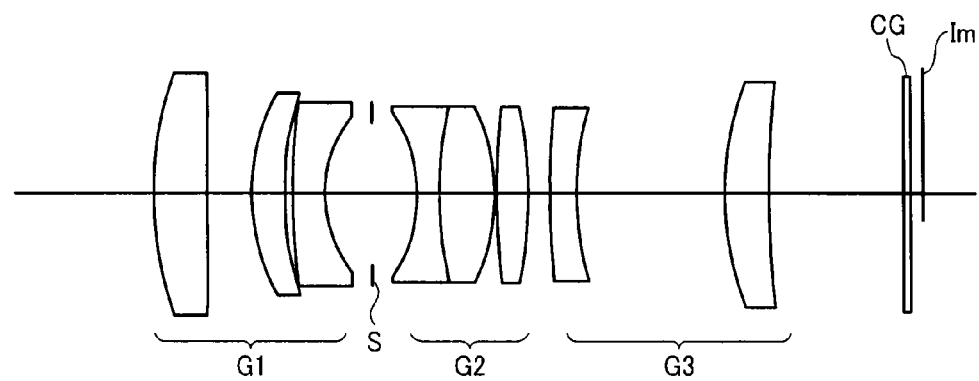
FIGS. 5A to 5C are diagrams illustrating an image forming lens according to a fifth example of the first embodiment.
Figure 5B:
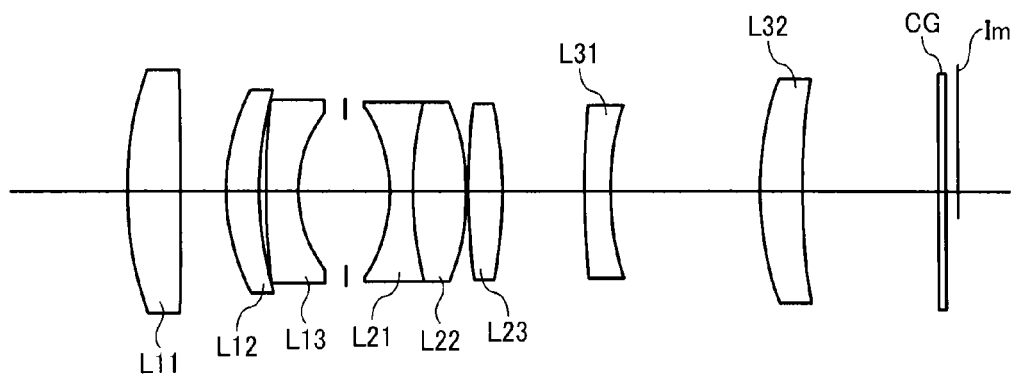
Figure 5C:
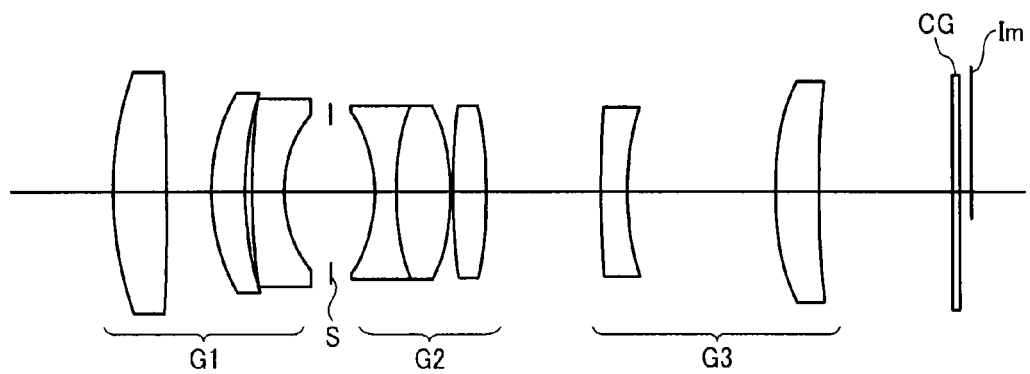

The fifth example described finally is a concrete example of the image forming lens illustrated in FIGS. 5A to 5C.

Fifth Example

| f = 50.01, F = 2.45, ω = 9.92 | | | | | | |
|---|---|---|---|---|---|---|
| Surface No. | R | D | $N_d$ | $v_d$ | $\theta_{g,F}$ | Glass Type |
| 01 | 31.857 | 5.00 | 1.60300 | 65.44 | 0.5401 | OHARA S-PHM53 |
| 02 | -351.193 | 4.03 | | | | |
| 03 | 18.284 | 3.03 | 1.74320 | 49.34 | 0.5531 | OHARA S-LAM60 |
| 04 | 28.838 | 0.65 | | | | |
| 05 | 53.015 | 3.00 | 1.53172 | 48.84 | 0.5631 | OHARA S-TIL6 |
| 06 | 10.847 | 4.30 | | | | |
| 07 | stop | 4.14 | | | | |
| 08 | -12.662 | 2.00 | 1.63980 | 34.47 | 0.5922 | OHARA S-TIM27 |
| 09 | 28.313 | 5.00 | 1.71300 | 53.87 | 0.5459 | OHARA S-LAL8 |
| 10 | -19.018 | 0.20 | | | | |
| 11 | 64.971 | 3.00 | 1.65100 | 56.16 | 0.5482 | OHARA S-LAL54 |
| 12 | -36.236 | variable distance (A) | | | | |
| 13 | 83.447 | 2.50 | 1.85026 | 32.27 | 0.5929 | OHARA S-LAH71 |
| 14 | 25.471 | 13.56 | | | | |
| 15 | 28.378 | 4.00 | 1.84666 | 23.78 | 0.6205 | OHARA S-TIH53 |

-continued

| | | f = 50.01, F = 2.45, ω = 9.92 | | | |
|---|---|---|---|---|---|
| 16 | 72.625 | 12.260 | | | |
| 17 | ∞ | 0.75 | 1.51633 | 64.14 | cover glass |
| 18 | ∞ | | | | |

<Variable Distance (A)>

| W. D | Infinity | 0.3 m | 0.2 m |
|---|---|---|---|
| A | 2.000 | 7.568 | 10.494 |

<Parameter Values in Conditional Expressions>

Figure 20:
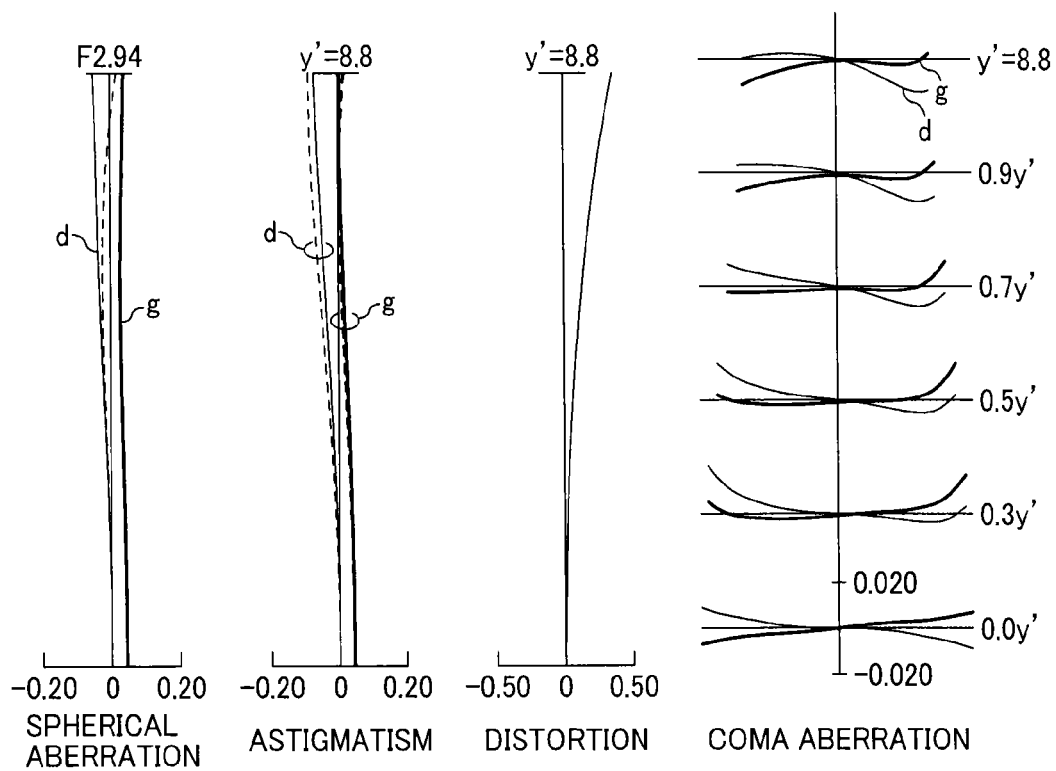
FIG. 20 is a diagram illustrating aberrations of the image forming lens according to the fifth example of the first embodiment in a state that focusing is performed at a working distance of 0.2 m.

(1) $D/L_{3F-1} = 0.401$
(2) $D/f = 0.271$
(3) $f/f_{1-2} = 1.24$
(4) $(r_{3NR} - r_{3PF})/(r_{3NR} + r_{3PF}) = -0.0540$
(5) $f_1/f_{1-2} = 2.23$
(6) $(r_{1NR} + r_{2NF})/(r_{1NR} - r_{2NF}) = -0.0772$
(7) $n_d = 1.60300$
(8) $v_d = 65.44$
(9) $\theta_{g,F} - (-0.001742 \times v_d + 0.6490) = 0.0052$ FIGS. 18 to 20 are diagrams illustrating aberrations of the image forming lens according to the fifth example in the same manner as FIGS. 6 to 8.

As illustrated in the diagrams of aberrations in the respective examples, the aberrations are corrected at a high level, and change of field curvature due to focusing is also suppressed in all of the respective examples.

The spherical aberration is "changed from a plus to a minus" due to focusing, but a change amount is small enough in an absolute value.

An axial chromatic aberration and a chromatic aberration of magnification are also small, and coma aberration and a color difference thereof are suppressed well up to outermost peripheral portions. Moreover, distortion is also less than 0.7% in an absolute value.

More specifically, according to all of the image forming lenses in the first to fifth examples, the various kinds of aberrations are suppressed well, resolving power supporting an image sensor of 6 million to 12 million pixels is provided, distortion is less than 1% in an absolute value, and a high-performance image forming lens having performance little varied due to focusing is achieved.

Note that, in all of the image forming lenses according to the first to fifth examples, all of the lenses forming the first lens group G1 to the third lens group G3 are spherical lenses and all of these lenses are made of the "inorganic solid material" as described above.

FIGS. 21A to 25C illustrate five exemplary image forming lenses according to a second embodiment. These working examples correspond to concrete first to fifth examples described later in this order.

In FIGS. 21A to 25C, a left side of the drawing is defined as an object side and a right side of the drawing is defined as an image side.

In FIGS. 21A to 25C, an upper diagram (indicated by A) illustrates a lens configuration diagram "in a state that focusing is performed on infinity", a middle diagram (indicated by B) illustrates a lens configuration diagram "in a state that focusing is performed at an intermediate distance", and a lower diagram (indicated by C) illustrates a lens configuration diagram "in a state that focusing is performed at a close distance".

Note that same reference sings as FIGS. 1A to 5C are used in FIGS. 21A to 25C to avoid complication.

Therefore, the image forming lens illustrated in FIGS. 21A to 25C is formed by sequentially arranging, from the object side to the image side, a first lens group G1 having positive refractive power, an aperture stop S, a second lens group G2 having positive refractive power, and a third lens group G3 having positive or negative refractive power.

As illustrated in FIGS. 21A to 25C, the third lens group G3 is fixed relative to an image surface Im, and the first lens group G1, aperture stop S, and second lens group G2 are integrally moved to the object side when "focusing is performed from a long distance (upper diagram) to a close distance (lower diagram)".

In other words, at the time of focusing, a "positional relation between the third lens group G3 and the image surface Im" is unchanged, and only a distance between the second lens group G2 and the third lens group G3 is changed.

The third lens group G3 is formed by sequentially arranging two lenses from the object side to the image side in order of a negative lens L31 and a positive lens L32.

The image forming lens according to the present embodiment satisfies a conditional expression (11):

$$4.0 < D/L_{2G-3G} < 12.0 \tag{11}$$

where

D is an air space between the negative lens and the positive lens forming the third lens group, and $L_{2G-3G}$ is a distance from a surface closest to the image side in the second lens group to a surface closest to the object side in the third lens group in the state that focusing is performed on an infinite distance object.

The image forming lenses in the later-described concrete first to fifth examples corresponding to the working examples illustrated in FIGS. 21A to 25C also satisfy the conditional expression (11), of course.

The conditional expression (11) is a condition to effectively suppress "change of respective aberrations" due to focusing in a state that the respective aberrations of the image forming lens are corrected with good balance.

When a parameter of the conditional expression (11) is 4.0 or less, "change of a spherical aberration due to focusing" becomes excessively large, and sufficient performance cannot be secured in a state that focusing is performed on an infinite side or a close distance side.

When the parameter of the conditional expression (11) is 12.0 or more, a lens system tends to be increased in size and it is difficult to downsize the image forming lens while keeping the state of favorably correcting the coma aberration.

Preferably, the parameter of the conditional expression (11) satisfies a conditional expression (11A) slightly narrower than the conditional expression (11) in order to more effectively suppress "change of the spherical aberration due to focusing" and "size increase of the lens system":

$$4.5 < D/L_{2G-3G} < 11.0 \tag{11A}$$

In the above configuration, preferably, the image forming lens according to the second embodiment has the third lens group in which an image-side surface of the negative lens is formed as a concave surface and an object-side surface of the positive lens is formed as a convex surface, and a curvature radius $r_{3NR}$ (>0) of the image-side surface (concave surface) of the negative lens and a curvature radius $r_{3PF}$ (>0) of the object-side surface (convex surface) of the positive lens satisfy a following conditional expression (12):

$$-0.25 < (r_{3NR} - r_{3PF})/(r_{3NR} + r_{3PF}) < 0.05 \tag{12}$$

When a parameter of the conditional expression (12) is −0.25 or less, a spherical aberration tends to be generated on an under side and an inward coma aberration tends to be generated.

When the parameter value of the conditional expression (12) is 0.05 or more, the spherical aberration tends to be generated on an over side, and an outward coma aberration tends to be generated.

When the conditional expression (12) is satisfied, generation of the spherical aberration and coma aberration can be easily suppressed.

When the parameter of the conditional expression (12) is made to satisfy a following conditional expression (12A) slightly narrower than the conditional expression (12), generation of the spherical aberration and coma aberration can be more effectively suppressed:

$$-0.20 < (r_{3NR} - r_{3PF})/(r_{3NR} + r_{3PF}) < 0.00 \quad (12A).$$

The image forming lens according to the present embodiment has one of characteristics in that the third lens group fixed to the image surface at the time of focusing is formed by arranging the two lenses from the object side to the image side in order of the negative lens and the positive lens as described above.

The first lens group, aperture stop, and second lens group disposed on the object side of the third lens group are moved integrally at the time of focusing. Therefore, these "first lens group, aperture stop, and second lens group" are collectively referred to as a "movable group" in the following.

The "movable group" preferably has the following configuration.

More specifically, preferably, the first lens group is formed of "three lenses by arranging, on the image side of two positive lenses, a negative lens having a concave surface oriented to the image side", and the second lens group is "formed by arranging, on the object side of two positive lenses, at least a negative lens having a concave surface oriented to the object side".

In this case, the second lens group may be formed by arranging the three lenses from the object side to the image side in order of the negative lens, positive lens, and positive lens.

The second lens group may be also formed of four lenses by arranging, on the object side of two positive lenses, a negative lens having a concave surface oriented to the object side, and arranging, on the object side of the negative lens, a "positive lens having a concave surface oriented to the object side".

With this configuration, a so-called "Gaussian type", in which "arrangement of the first lens group, aperture stop, and second lens group" is symmetrical around the aperture stop, is formed, and the movable group can have a configuration in which "various kinds of aberrations are balanced with the minimal number of lenses in a compact state".

In the case of forming the movable group as described above, preferably a following conditional expression (13) is satisfied in addition to the conditional expression (11), or in addition to the conditional expressions (11), (12):

$$1.20 < f_1/f_{1\text{-}2} < 4.00 \quad (13).$$

In the parameter of the conditional expression (13), "$f_1$" is a focal length of the first lens group, and "$f_{1\text{-}2}$" is a composite focal length of the first lens group and the second lens group.

The parameter $f_1/f_{1\text{-}2}$ of the conditional expression (13) is a ratio between the focal length of the first lens group and the "composite focal length of the movable group", and the conditional expression (13) is a condition to keep good balance of the refractive power of the first lens group in the movable group relative to the refractive power of the movable group.

When a parameter value of the conditional expression (13) is 1.20 or less, the refractive power of the first lens group becomes relatively excessively large with respect to the "refractive power of the movable group", and in the case of 4.00 or more, the refractive power of the first lens group becomes relatively excessively small.

Therefore, when the parameter is out of a range of the conditional expression (13), the coma aberration and distortion tend to be generated.

By satisfying the conditional expression (13), generation of the coma aberration and distortion can be effectively suppressed.

Meanwhile, preferably, the parameter $f_1/f_{1\text{-}2}$ satisfies a following conditional expression (13A) slightly narrower than the conditional expression (13):

$$1.50 < f_1/f_{1\text{-}2} < 3.00 \quad (13A).$$

In the case of forming the movable group in the Gaussian type as described above, preferably, a following conditional expression (14) is satisfied in addition to the conditional expression (11), in addition to the conditional expressions (11), (12), or in addition to the conditional expressions (11), (12), (13):

$$-0.15 < (r_{1NR} + r_{2NF})/(r_{1NR} - r_{2NF}) < 0.05 \quad (14).$$

In the parameter of the conditional expression (14), "$r_{1NR}$ (>0)" is a curvature radius of the "image-side surface of the negative lens having the concave surface oriented to the image side" in the first lens group, and "$r_{2NF}$ (<0)" is a curvature radius of the "object-side surface of the negative lens having the concave surface oriented to the object side" in the second lens group.

The conditional expression (14) is adopted to control a shape of a "negative air lens" formed on an adjacent surface between the first lens group and the second lens group interposing the aperture stop.

When the parameter is out of a range of the conditional expression (14), a "symmetrical shape" of the air lens is collapsed, and favorably correcting the coma aberration becomes difficult. The coma aberration can be easily corrected by satisfying the conditional expression (14).

Preferably, the image forming lens according to the present embodiment satisfies a following conditional expression (15) in addition to the conditional expression (11), or in addition to the conditional expression (11) and any one of the conditional expressions (12) to (14):

$$1.10 < f/f_{1\text{-}2} < 1.40 \quad (15).$$

In the parameter, "f" is a focal length of an entire system in a state that focusing is performed on an infinite distance object, and "$f_{1\text{-}2}$" is the composite focal length of the first lens group and the second lens group.

When a parameter value of the conditional expression (15) is 1.10 or less, "magnification of the third lens group" becomes relatively small with respect to magnification of the entire system.

Therefore, a "moving amount of the movable group" becomes large at the time of focusing.

Particularly, in the case where the image forming lens has a relatively narrow field angle such as a half field angle of about 10 degrees, more specifically, in the case of having a "relatively long focal length", an "actual image forming lens including a driving mechanism to drive the movable group" tends to be increased in size.

When the parameter of the conditional expression (15) is 1.4 or more, the magnification of the third lens group is relatively large, and an image aberration generated by the movable group is enlarged at the third lens group.

Therefore, when the parameter exceeds an upper limit of the conditional expression (15), correction for various kinds of aberrations is hardly balanced.

More preferably, the parameter of the conditional expression (15) satisfies a following conditional expression (15A) slightly narrower than the conditional expression (15):

$$1.10 < f/f_{1-2} < 1.30 \tag{15A}$$

In the case where the "lens closest to the object side" in the first lens group is the positive lens in the image forming lens according to the present embodiment, preferably, the positive lens has material quality satisfying following conditional expressions (16), (17), (18) in any of the above-described cases:

$$1.58 < n_d < 1.63, \tag{16}$$

$$62.0 < v_d < 70.0, \tag{17}$$ and $$0.004 < \theta_{g,F} - (-0.001742 \times v_d + 0.6490) < 0.030. \tag{18}$$

In the conditional expressions (16), (17), "$n_d$" and "$v_d$" respectively indicate a "refractive index with respect to d line and an Abbe's number" of the material quality of the positive lens.

In the conditional expression (18), "$\theta_{g,F}$" is a partial dispersion ratio, and defined as follows by the refractive indexes $n_g$, $n_F$, $n_C$ with respect to g line, F line, C line of the lens material:

$$\theta_{g,F} = (n_g - n_F)/(n_F - n_C).$$

"More favorably correcting a chromatic aberration" can be achieved by forming the positive lens of the first lens group with material that has a dispersion property and satisfies the conditional expressions (16), (17), and (18).

The larger the focal length f of the image forming lens is, the more the chromatic aberration tends to be generated. However, when the positive lens is made of the material satisfying the conditional expressions (16) to (18), generation of the chromatic aberration can be effectively suppressed even in the case where the focal length is elongated.

The image forming lens used in the above-described "image input device for machine vision" is considered to have the half field angle of about 10 degrees as an almost telescopic lens in which a working distance can be easily secured and perspective influence is hardly received.

The conditional expressions (16) to (18) are effective to suppress generation of the chromatic aberration in the image forming lens having the above-mentioned half field angle of about 10 degrees.

Note that the "working distance" is an operating distance, and is a distance between an end of the lens and an object surface of a target to be imaged for image inputting (also referred to as a "work").

The image forming lens of the present embodiment may, of course, adopt one or more of special surfaces such as an aspheric surface and a diffractive surface, but all of the lens surfaces may be formed of spherical surfaces as well.

When the special surfaces such as the aspheric surface and the diffractive surface are not adopted, "high manufacturing cost" spent for a die for molding can be saved, for example, and particularly, it is economically advantageous at the time of small-lot production.

Further, preferably, all of the lenses constituting the image forming lens are made of "inorganic solid material" respectively. The lens made of organic material, "organic-inorganic hybrid material", etc. has a property largely varied by environmental conditions such as temperature and humidity.

When all of the lenses constituting the image forming lens are made of the "inorganic solid material", the image forming lens hardly receiving influence from change of the environmental conditions such as temperature and humidity can be provided.

EXAMPLES

In the following, the first to fifth examples will be described as concrete examples of the image forming lenses according to the working examples illustrated in FIGS. 21A to 25C.

The image forming lenses of the first to fifth examples are assumed to be used in an image input device for machine vision, and are almost telescopic image forming lenses in which a working distance can be easily secured and perspective influence is hardly received.

As illustrated in FIGS. 21A to 25C, the image forming lens is formed by sequentially arranging the first lens group G1, aperture stop S, second lens group G2, and third lens group G3 from the object side to the image side.

The first lens group G1 is formed by sequentially arranging three lenses from the object side to the image side in order of a positive lens L11, a positive lens L12, and a negative lens L13.

The second lens group G2 disposed on the image side of the aperture stop S is formed by sequentially arranging, from the object side to the image side, three lenses in order of a negative lens L21, a positive lens L22, and a positive lens L23, or four lenses in order of a positive lens L21A, a negative lens L21B, a positive lens L22, and a positive lens L23.

The third lens group G3 is formed by sequentially arranging the negative lens L31 and positive lens L32 from the object side to the image side as described above.

In all of the first to fifth examples, a "maximum image height is 8.8 mm".

In the respective examples, a cover glass CG having a form of the parallel flat plate disposed on the image surface side of the third lens group G3 is arranged such that an image-side surface thereof is located at a position about 1.0 mm from the image surface Im on the object side, but not limited thereto, of course.

The image forming lens in the first example has a focal length of about 35 mm and a half field angle of about 14 degrees in a state that focusing is performed on an infinite distance object. The image forming lens in the second to fifth examples is obtained by embodying specifications of a focal length of about 50 mm and a half field angle of about 10 degrees in a state that focusing is performed on the infinite distance object.

A close distance of the image forming lens in the first example is set at "0.15 m as the working distance".

A close distance in the image forming lens in the second example to fifth example is set at "0.2 m as the working distance".

All of the image forming lenses in the first example to fifth example have photographing magnification at the close distance is substantially 0.25 times or more.

Since the signs used in the respective examples of the second embodiment are defined same as the first embodiment, a description therefor will be omitted.

Figure 21A:
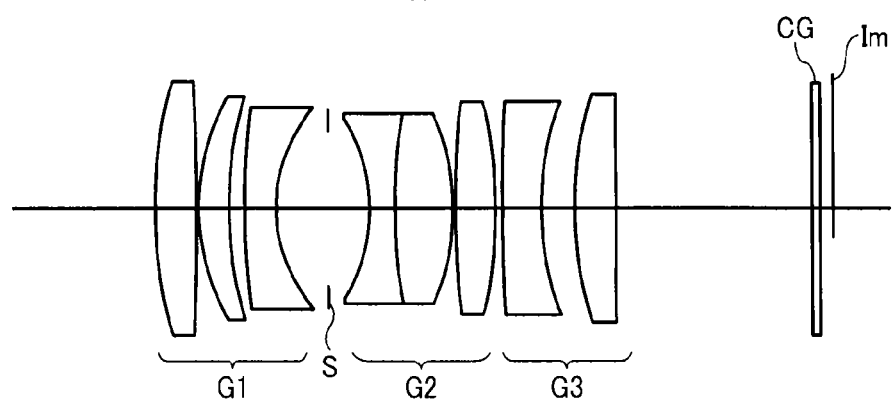
FIGS. 21A to 21C are diagrams illustrating an image forming lens according to a first example of a second embodiment.
Figure 21B:
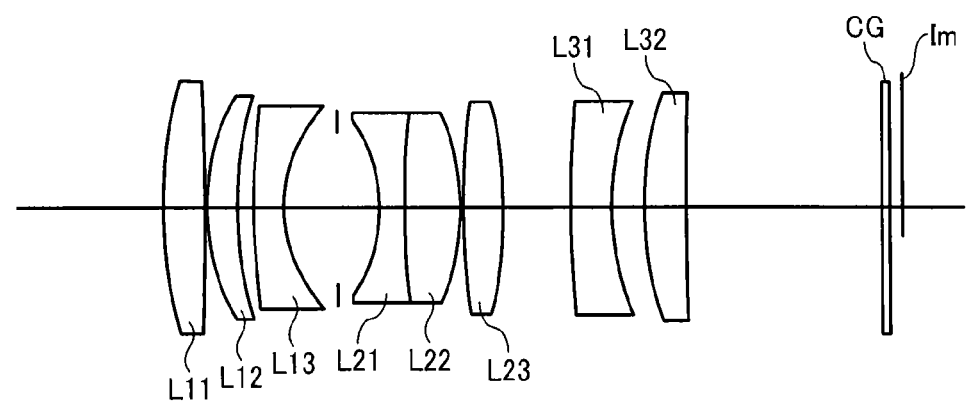
Figure 21C:
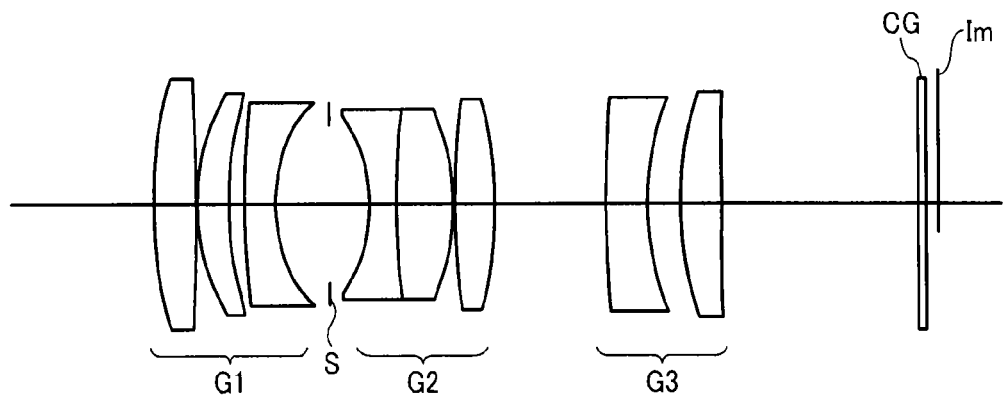

The first example described first is a concrete example of the image forming lens illustrated in FIGS. 21A to 21C.

First Example $f = 35.00, F = 1.82, \omega = 14.09$

| Surface No. | R | D | $N_d$ | $v_d$ | $\theta_{g,F}$ | Glass Type |
|---|---|---|---|---|---|---|
| 01 | 39.607 | 3.50 | 1.83481 | 42.72 | 0.5648 | OHARA S-LAH55V |
| 02 | −320.677 | 0.20 | | | | |
| 03 | 17.819 | 2.68 | 1.74320 | 49.34 | 0.5531 | OHARA S-LAM60 |
| 04 | 30.240 | 1.36 | | | | |
| 05 | 66.118 | 2.66 | 1.67270 | 32.10 | 0.5988 | OHARA S-TIM25 |
| 06 | 12.153 | 4.60 | | | | |
| 07 | stop | 3.60 | | | | |
| 08 | −12.836 | 2.20 | 1.68893 | 31.07 | 0.6004 | OHARA S-TIM28 |
| 09 | 52.078 | 5.00 | 1.71300 | 53.87 | 0.5459 | OHARA S-LAL8 |
| 10 | −18.842 | 0.20 | | | | |
| 11 | 72.561 | 3.50 | 1.83481 | 42.72 | 0.5648 | OHARA S-LAH55V |
| 12 | −38.978 | variable distance (A) | | | | |
| 13 | 107.845 | 3.50 | 1.64769 | 33.79 | 0.5938 | OHARA S-TIM22 |
| 14 | 22.368 | 2.84 | | | | |
| 15 | 31.305 | 3.50 | 1.83481 | 42.72 | 0.5648 | OHARA S-LAH55V |
| 16 | 375.433 | 16.872 | | | | |
| 17 | ∞ | 0.75 | 1.51633 | 64.14 | | cover glass |
| 18 | ∞ | | | | | |

In the above data, "stop" indicates the "aperture stop", of course.

<Variable Distance (A)>

| W. D | Infinity | 0.25 m | 0.15 m |
|---|---|---|---|
| A | 0.500 | 5.791 | 9.583 |

<Parameter Values in Conditional Expressions>

(1) $D/L_{2G-3G} = 5.68$
(2) $(r_{3NR} - r_{3PF})/(r_{3NR} + r_{3PF}) = -0.167$
(3) $f_1/f_{1-2} = 2.64$
(4) $(r_{1NR} + r_{2NF})/(r_{1NR} - r_{2NF}) = -0.0273$
(5) $f/f_{1-2} = 0.983$
(6) $n_d = 1.83481$
(7) $v_d = 42.72$
(9) $\theta_{g,F} - (-0.001742 \times v_d + 0.6490) = -0.0098$ The image forming lens in the first example has a "relatively short" focal length f of 35 mm and a half field angle of about 14 degrees, and the conditional expressions (6) to (8) are not satisfied because there is no practical problem of "chromatic aberration increase due to having a long focal length".

Figure 22A:
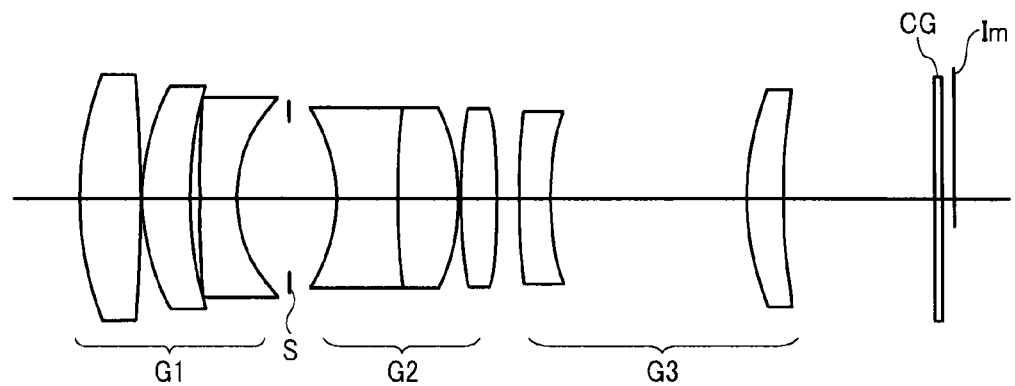
FIGS. 22A to 22C are diagrams illustrating an image forming lens according to a second example of the second embodiment.
Figure 22B:
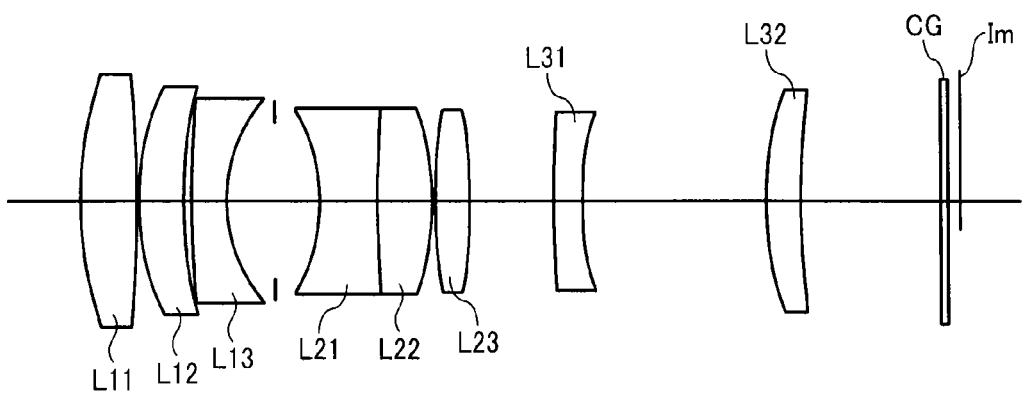
Figure 22C:
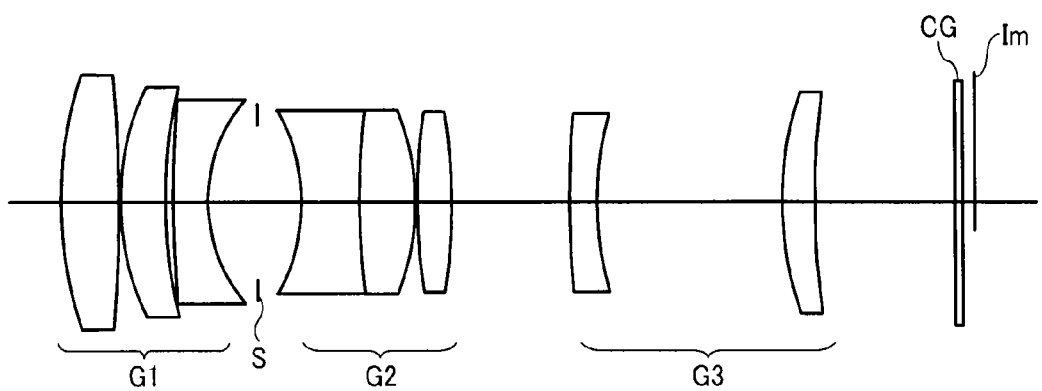

The second example described next is a concrete example of the image forming lens illustrated in FIGS. 22A to 22C.

Second Example $f = 50.00, F = 2.45, \omega = 9.92$

| Surface No. | R | D | $N_d$ | $v_d$ | $\theta_{g,F}$ | Glass Type |
|---|---|---|---|---|---|---|
| 01 | 32.061 | 5.00 | 1.61800 | 63.33 | 0.5441 | OHARA S-PHM52 |
| 02 | −139.329 | 0.20 | | | | |
| 03 | 21.428 | 4.00 | 1.74320 | 49.34 | 0.5531 | OHARA S-LAM60 |
| 04 | 37.150 | 0.73 | | | | |
| 05 | 116.366 | 3.00 | 1.56732 | 42.82 | 0.5731 | OHARA S-TIL26 |
| 06 | 12.500 | 4.30 | | | | |
| 07 | stop | 3.90 | | | | |
| 08 | −14.500 | 5.00 | 1.67270 | 32.10 | 0.5988 | OHARA S-TIM25 |
| 09 | 73.560 | 5.00 | 1.65100 | 56.16 | 0.5482 | OHARA S-LAL54 |
| 10 | −20.097 | 0.20 | | | | |
| 11 | 53.722 | 3.00 | 1.71300 | 53.87 | 0.5459 | OHARA S-LAL8 |
| 12 | −51.528 | variable distance (A) | | | | |
| 13 | 85.541 | 2.50 | 1.62230 | 53.17 | 0.5542 | OHARA S-BSM22 |
| 14 | 25.940 | 16.24 | | | | |
| 15 | 27.554 | 2.96 | 1.58144 | 40.75 | 0.5774 | OHARA S-TIL25 |
| 16 | 68.446 | 12.226 | | | | |
| 17 | ∞ | 0.75 | 1.51633 | 64.14 | | cover glass |
| 18 | ∞ | | | | | |

<Variable Distance (A)>

| W. D | Infinity | 0.3 m | 0.2 m |
|---|---|---|---|
| A | 1.900 | 7.493 | 10.450 |

<Parameter Values in Conditional Expressions>

Figure 23A:
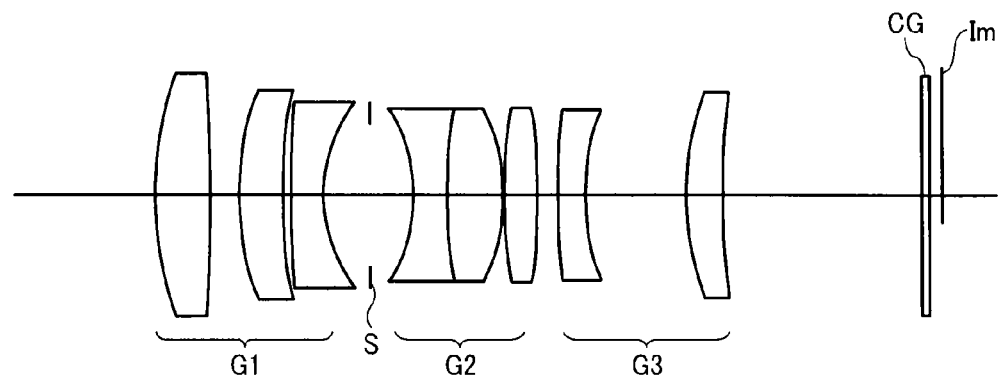
FIGS. 23A to 23C are diagrams illustrating an image forming lens according to a third example of the second embodiment.
Figure 23B:
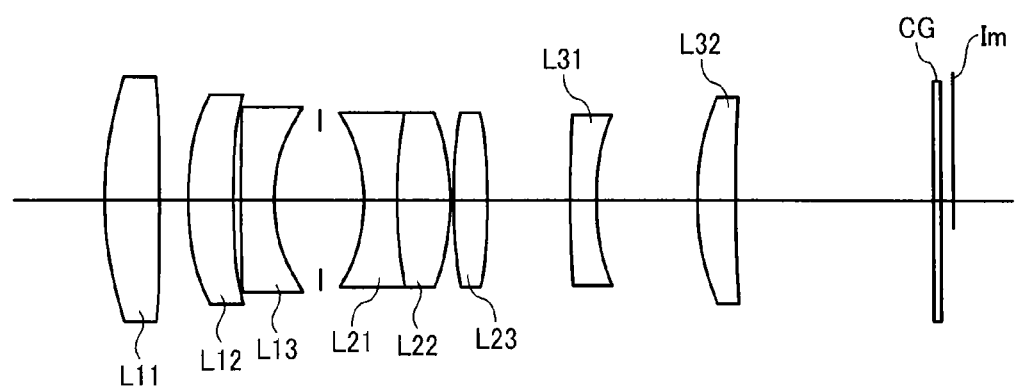
Figure 23C:
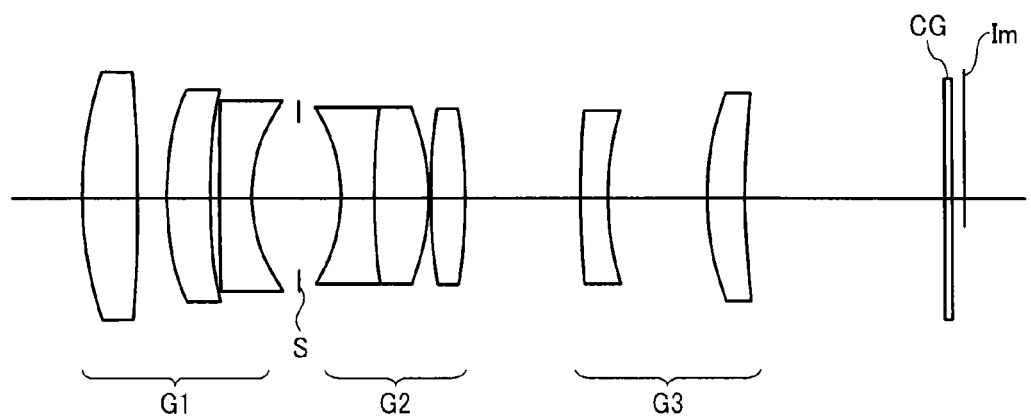

(1) $D/L_{2G-3G} = 8.55$
(2) $(r_{3NR} - r_{3PF})/(r_{3NR} + r_{3PF}) = -0.0302$
(3) $f_1/f_{1-2} = 2.07$
(4) $(r_{1NR} + r_{2NF})/(r_{1NR} - r_{2NF}) = -0.0741$
(5) $f/f_{1-2} = 1.24$
(6) $n_d = 1.61800$
(7) $v_d = 63.33$
(8) $\theta_{g,F} - (-0.001742 \times v_d + 0.6490) = 0.0055$ The third example described next is a concrete example of the image forming lens illustrated in FIGS. 23A to 23C.

Third Example $f = 50.00, F = 2.45, \omega = 9.99$

| Surface No. | R | D | $N_d$ | $v_d$ | $\theta_{g,F}$ | Glass Type |
|---|---|---|---|---|---|---|
| 01 | 32.264 | 5.00 | 1.61800 | 63.33 | 0.5441 | OHARA S-PHM52 |
| 02 | −177.652 | 2.61 | | | | |
| 03 | 23.418 | 4.00 | 1.78590 | 44.20 | 0.5631 | OHARA S-LAH51 |
| 04 | 45.843 | 0.77 | | | | |
| 05 | 1630.890 | 3.00 | 1.60342 | 38.03 | 0.5835 | OHARA S-TIM5 |
| 06 | 13.278 | 4.30 | | | | |
| 07 | stop | 3.90 | | | | |
| 08 | −13.780 | 3.00 | 1.62004 | 36.26 | 0.5879 | OHARA S-TIM2 |

-continued

| | | f = 50.00, F = 2.45, ω = 9.99 | | | | |
|---|---|---|---|---|---|---|
| 09 | 44.673 | 5.00 | 1.65100 | 56.16 | 0.5482 | OHARA S-LAL54 |
| 10 | −18.393 | 0.20 | | | | |
| 11 | 47.326 | 3.00 | 1.71300 | 53.87 | 0.5459 | OHARA S-LAL8 |
| 12 | −58.035 | variable distance (A) | | | | |
| 13 | 69.224 | 2.50 | 1.80610 | 40.93 | 0.5701 | OHARA S-LAH53 |
| 14 | 22.797 | 9.05 | | | | |
| 15 | 25.136 | 3.50 | 1.59551 | 39.24 | 0.5803 | OHARA S-TIM8 |
| 16 | 87.309 | 17.956 | | | | |
| 17 | ∞ | 0.75 | 1.51633 | 64.14 | | cover glass |
| 18 | ∞ | | | | | |

<Variable Distance (A)>

| W. D | Infinity | 0.3 m | 0.2 m |
|---|---|---|---|
| A | 1.900 | 7.517 | 10.475 |

<Parameter Values in Conditional Expressions>

Figure 24A:
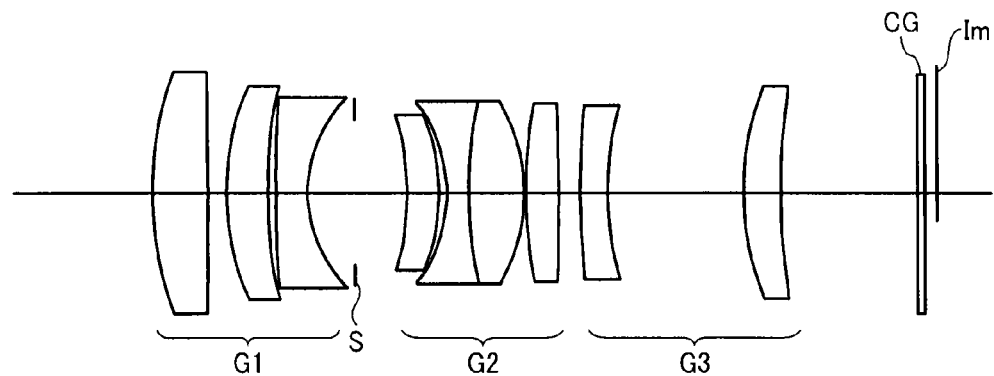
FIGS. 24A to 24C are diagrams illustrating an image forming lens according to a fourth example of the second embodiment.
Figure 24B:
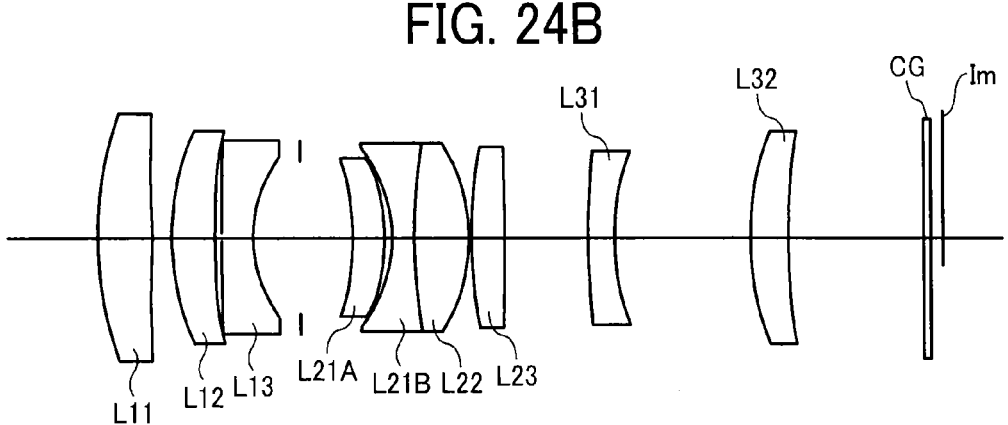
Figure 24C:
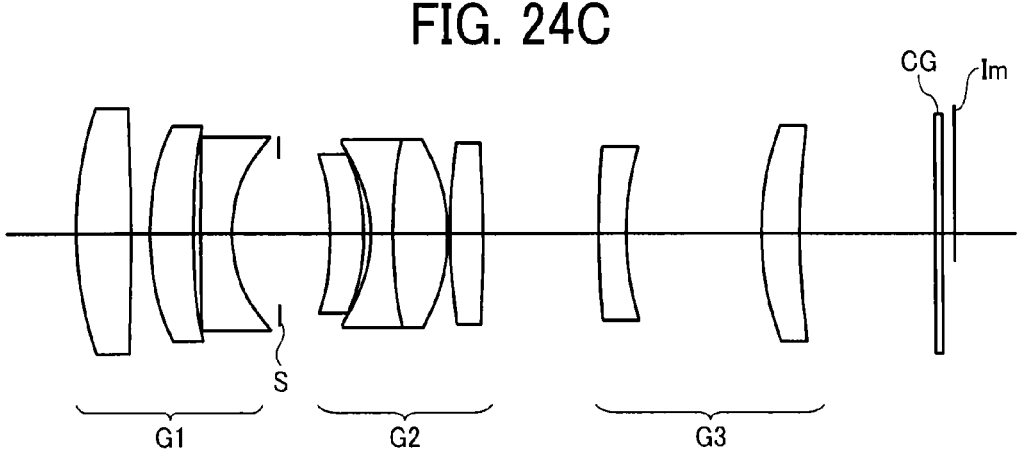

(1) $D/L_{2G-3G} = 4.76$
(2) $(r_{3NR} - r_{3PF})/(r_{3NR} + r_{3PF}) = -0.0488$
(3) $f_1/f_{1-2} = 1.81$
(4) $(r_{1NR} + r_{2NF})/(r_{1NR} - r_{2NF}) = -0.0186$
(5) $f/f_{1-2} = 1.24$
(6) $n_d = 1.61800$
(7) $\nu_d = 63.33$
(8) $\theta_{g,F} - (-0.001742 \times \nu_d + 0.6490) = 0.0055$ The fourth example described next is a concrete example of the image forming lens illustrated in FIGS. 24A to 24C.

Fourth Example

| | | f = 50.00, F = 2.45, ω = 9.92 | | | | |
|---|---|---|---|---|---|---|
| Surface No. | R | D | $N_d$ | $\nu_d$ | $\theta_{g,F}$ | Glass Type |
| 01 | 30.592 | 5.00 | 1.61800 | 63.33 | 0.5441 | OHARA S-PHM52 |
| 02 | −386.855 | 1.63 | | | | |
| 03 | 21.275 | 4.00 | 1.78590 | 44.20 | 0.5631 | OHARA S-LAH51 |
| 04 | 44.410 | 0.59 | | | | |
| 05 | 118.176 | 3.00 | 1.60342 | 38.03 | 0.5835 | OHARA S-TIM5 |
| 06 | 11.488 | 4.30 | | | | |
| 07 | stop | 4.73 | | | | |
| 08 | −22.114 | 3.00 | 1.48749 | 70.24 | 0.5300 | OHARA S-FSL5 |
| 09 | −16.612 | 0.66 | | | | |
| 10 | −12.075 | 2.00 | 1.60342 | 38.03 | 0.5835 | OHARA S-TIM5 |
| 11 | 38.763 | 5.00 | 1.65100 | 56.16 | 0.5482 | OHARA S-LAL54 |
| 12 | −15.623 | 0.20 | | | | |
| 13 | 44.789 | 3.00 | 1.71300 | 53.87 | 0.5459 | OHARA S-LAL8 |
| 14 | −235.889 | variable distance (A) | | | | |
| 15 | 66.771 | 2.50 | 1.80610 | 40.93 | 0.5701 | OHARA S-LAH53 |
| 16 | 24.406 | 12.38 | | | | |
| 17 | 26.340 | 3.50 | 1.69895 | 30.13 | 0.6030 | OHARA S-TIM35 |
| 18 | 60.579 | 12.322 | | | | |
| 19 | ∞ | 0.75 | 1.51633 | 64.14 | | cover glass |
| 20 | ∞ | | | | | |

<Variable Distance (A)>

| W. D | Infinity | 0.3 m | 0.2 m |
|---|---|---|---|
| A | 1.900 | 7.525 | 10.445 |

<Parameter Values in Conditional Expressions>

(1) $D/L_{2G-3G} = 6.52$
(2) $(r_{3NR} - r_{3PF})/(r_{3NR} + r_{3PF}) = -0.0381$
(3) $f_1/f_{1-2} = 2.49$
(4) $(r_{1NR} + r_{2NF})/(r_{1NR} - r_{2NF}) = -0.0249$
(5) $f/f_{1-2} = 1.23$
(6) $n_d = 1.61800$
(7) $\nu_d = 63.33$
(8) $\theta_{g,F} - (-0.001742 \times \nu_d + 0.6490) = 0.0055$ It should be noted that the fourth example is an example of forming the second lens group with the "four lenses including the positive lens L21A, negative lens L21B, positive lens L23, and positive lens L24".

In the parameter of the conditional expression (14), "$r_{2NF}$" is a surface of a surface number 10 (an image-side surface of the negative lens L21B is cemented with an object-side surface of the positive lens L22).

Figure 25A:
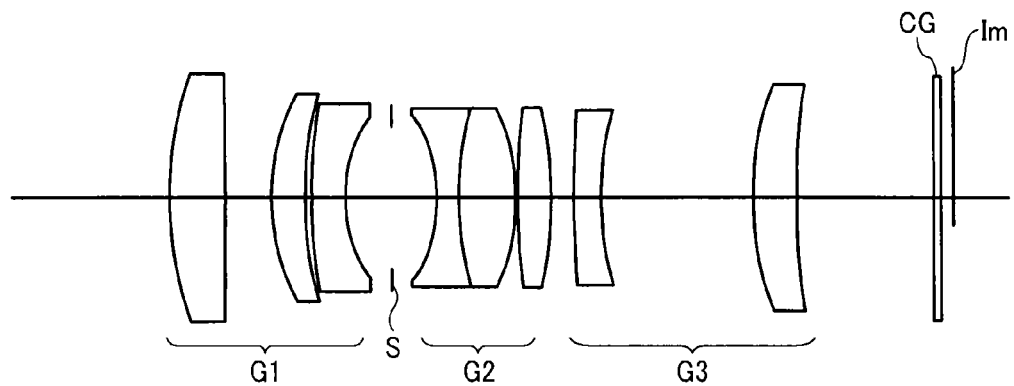
FIGS. 25A to 25C are diagrams illustrating an image forming lens according to a fifth example of the second embodiment.
Figure 25B:
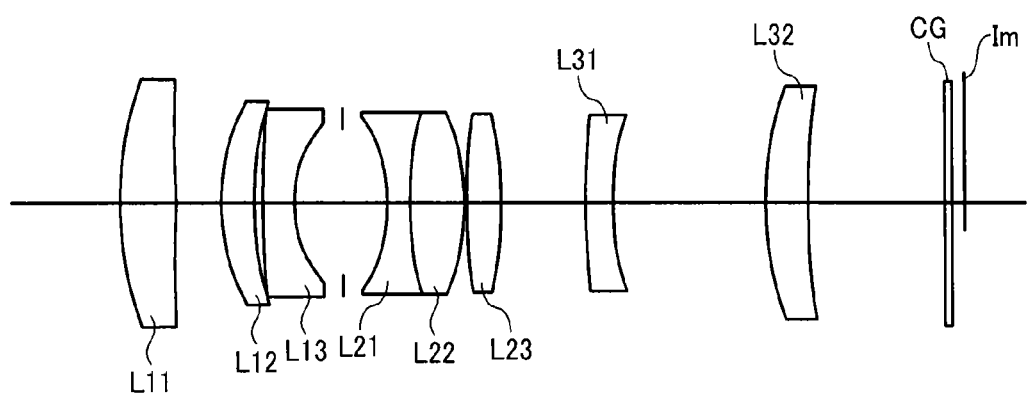
Figure 25C:
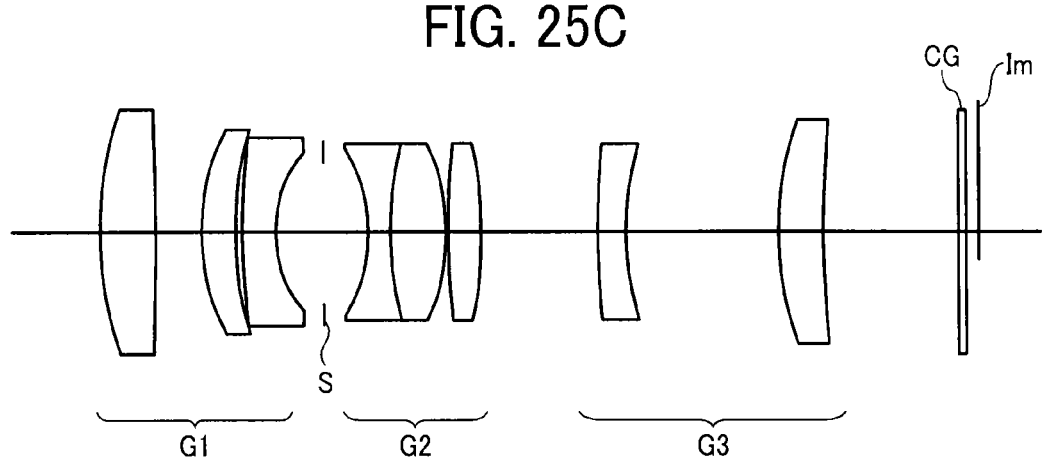

The fifth example described finally is a concrete example of the image forming lens illustrated in FIGS. 25A to 25C.

Fifth Example

| | | f = 50.01, F = 2.45, ω = 9.92 | | | | |
|---|---|---|---|---|---|---|
| Surface No. | R | D | $N_d$ | $\nu_d$ | $\theta_{g,F}$ | Glass Type |
| 01 | 31.857 | 5.00 | 1.60300 | 65.44 | 0.5401 | OHARA S-PHM53 |
| 02 | −351.193 | 4.03 | | | | |
| 03 | 18.284 | 3.03 | 1.74320 | 49.34 | 0.5531 | OHARA S-LAM60 |
| 04 | 28.838 | 0.65 | | | | |
| 05 | 53.015 | 3.00 | 1.53172 | 48.84 | 0.5631 | OHARA S-TIL6 |
| 06 | 10.847 | 4.30 | | | | |
| 07 | stop | 4.14 | | | | |
| 08 | −12.662 | 2.00 | 1.63980 | 34.47 | 0.5922 | OHARA S-TIM27 |
| 09 | 28.313 | 5.00 | 1.71300 | 53.87 | 0.5459 | OHARA S-LAL8 |
| 10 | −19.018 | 0.20 | | | | |
| 11 | 64.971 | 3.00 | 1.65100 | 56.16 | 0.5482 | OHARA S-LAL54 |
| 12 | −36.236 | variable distance (A) | | | | |
| 13 | 83.447 | 2.50 | 1.85026 | 32.27 | 0.5929 | OHARA S-LAH71 |
| 14 | 25.471 | 13.56 | | | | |
| 15 | 28.378 | 4.00 | 1.84666 | 23.78 | 0.6205 | OHARA S-TIH53 |

-continued f = 50.01, F = 2.45, ω = 9.92

| 16 | 72.625 | 12.260 | | | |
|----|--------|--------|--------|-------|-------|
| 17 | ∞ | 0.75 | 1.51633 | 64.14 | cover glass |
| 18 | ∞ | | | | |

<Variable Distance (A)>

| W. D | Infinity | 0.3 m | 0.2 m |
|------|----------|-------|-------|
| A | 2.000 | 7.568 | 10.494 |

<Parameter Values in Conditional Expressions>

Figure 26:
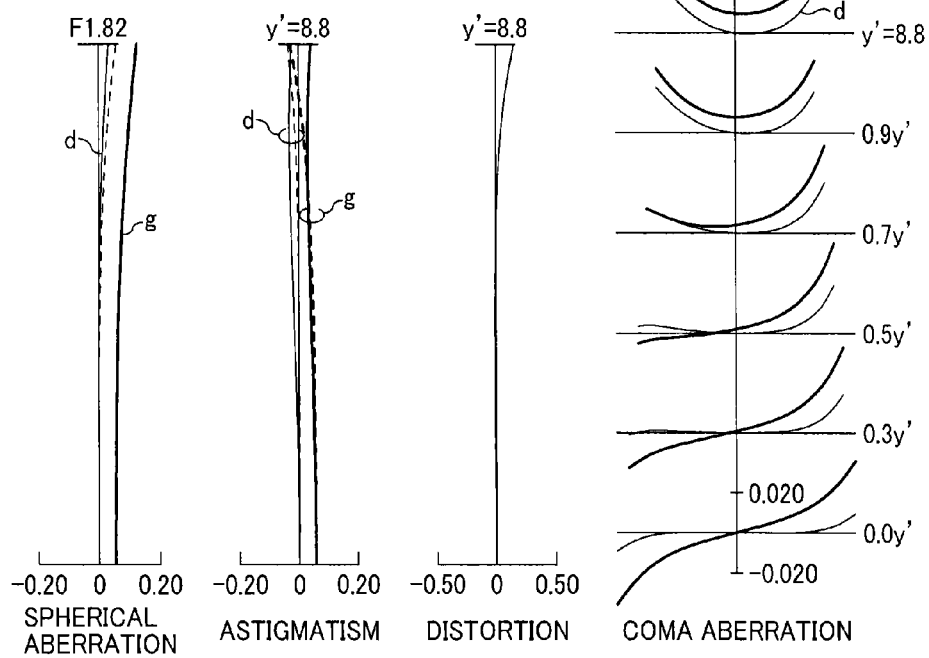
FIG. 26 is a diagram illustrating aberrations of the image forming lens according to the first example of the second embodiment in a state that focusing is performed on infinity.

(1) $D/L_{2G\text{-}3G} = 6.78$
(2) $(r_{3NR} - r_{3PF})/(r_{3NR} + r_{3PF}) = -0.0540$
(3) $f_1/f_{1\text{-}2} = 2.23$
(4) $(r_{1NR} + r_{2NF})/(r_{1NR} - r_{2NF}) = -0.0772$
(5) $f/f_{1\text{-}2} = 1.24$
(6) $n_d = 1.60300$
(7) $v_d = 65.44$
(8) $\theta_{g,F} - (-0.001742 \times v_d + 0.6490) = 0.0052$ FIG. 26 is a diagram illustrating aberrations of the image forming lens according to the first example "in the state that focusing is performed on infinity".

Figure 27:
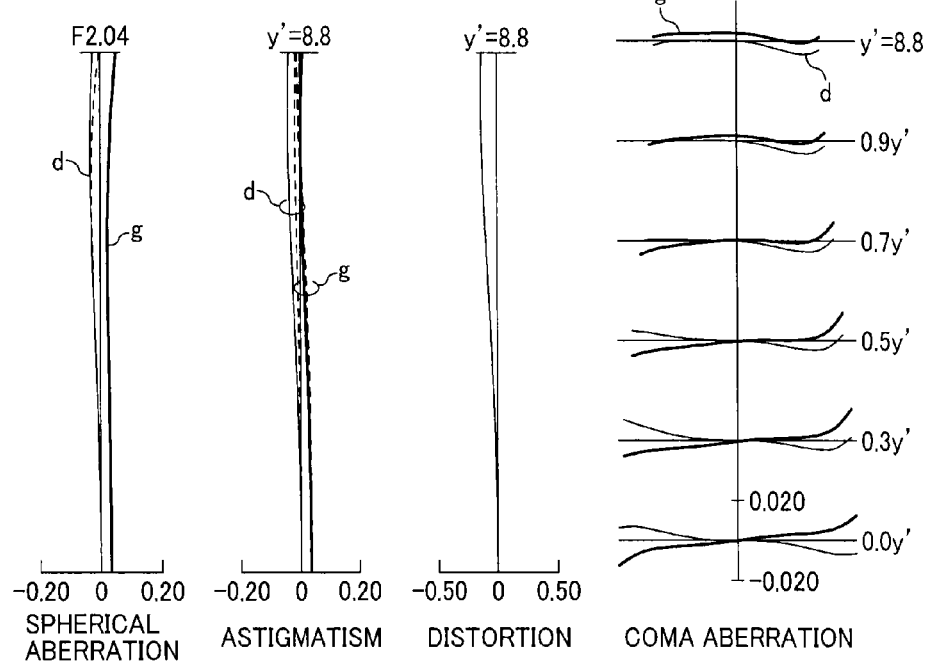
FIG. 27 is a diagram illustrating aberrations of the image forming lens according to the first example of the second embodiment in a state that focusing is performed at a working distance of 0.25 m.

FIG. 27 is a diagram illustrating aberrations of the image forming lens according to the first example in a state that focusing is performed at a working distance of 0.25 m.

FIG. 28 is a diagram illustrating aberrations of the image forming lens according to the first example in a state that focusing is performed at a working distance of 0.15 m.

In these diagrams of aberrations, dashed lines in the spherical aberration diagrams indicate "sine conditions", and in the diagrams of astigmatism, solid lines indicate "sagittal" and dashed lines indicate "meridional". Further, "d" indicates the d line, and "g" indicates the g line. The same is applied to second example to fifth example in the following.

Figure 30:
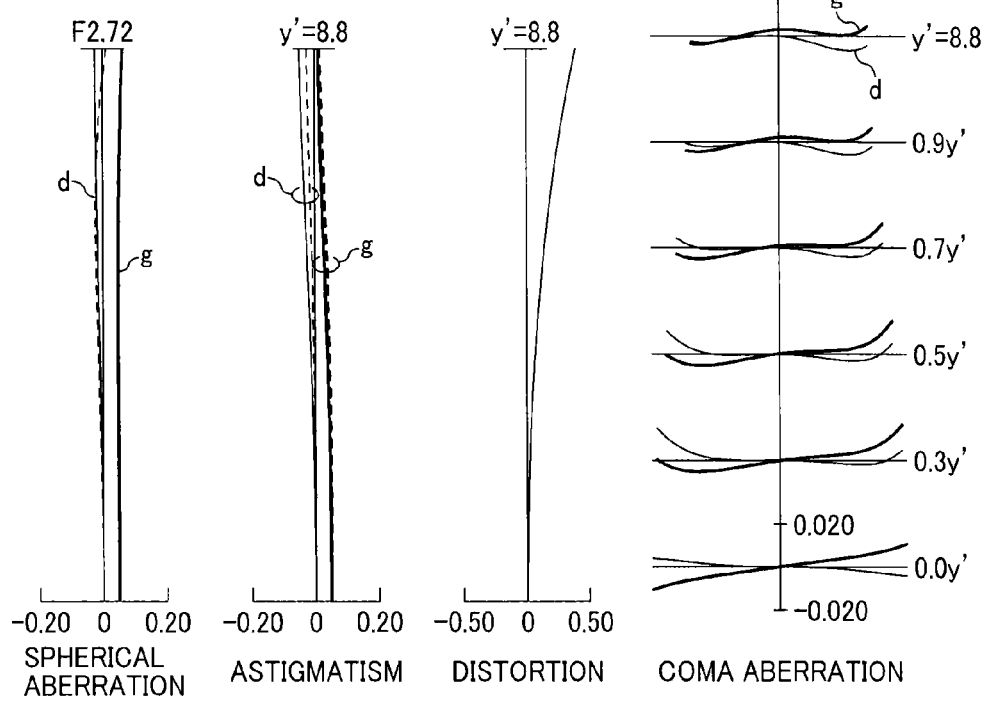
FIG. 30 is a diagram illustrating aberrations of the image forming lens according to the second example of the second embodiment in a state that focusing is performed at a working distance of 0.3 m.
Figure 31:
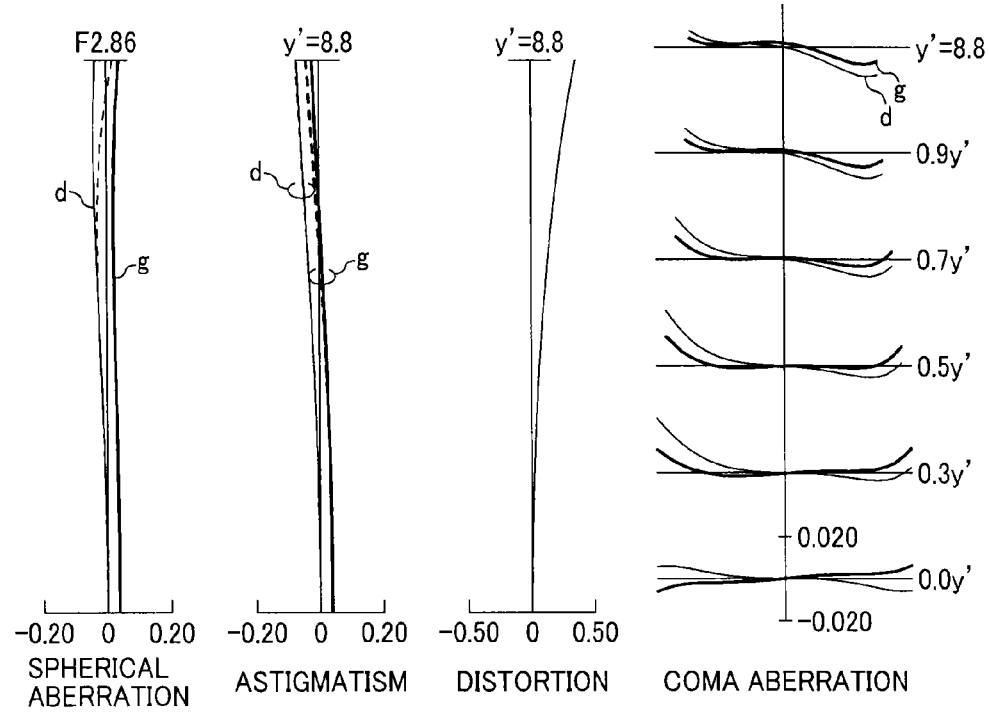
FIG. 31 is a diagram illustrating aberrations of the image forming lens according to the second example of the second embodiment in a state that focusing is performed at a working distance of 0.2 m.

FIGS. 29 to 31 are diagrams illustrating aberrations of the image forming lens according to the second example in the same manner as FIGS. 26 to 28.

Figure 32:
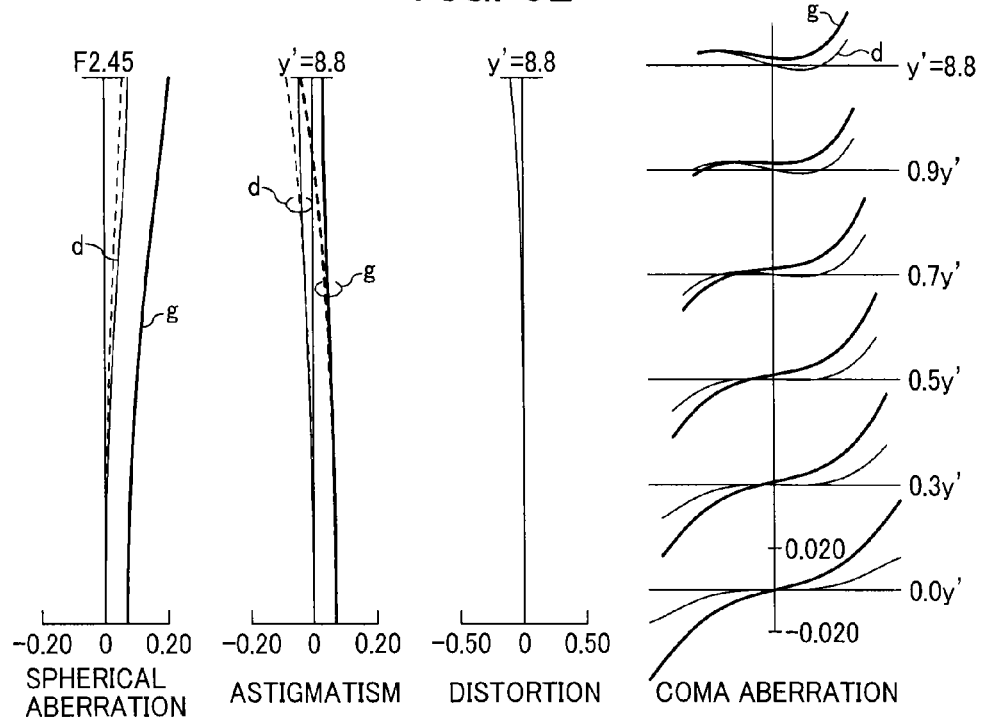
FIG. 32 is a diagram illustrating aberrations of the image forming lens according to the third example of the second embodiment in a state that focusing is performed on infinity.
Figure 33:
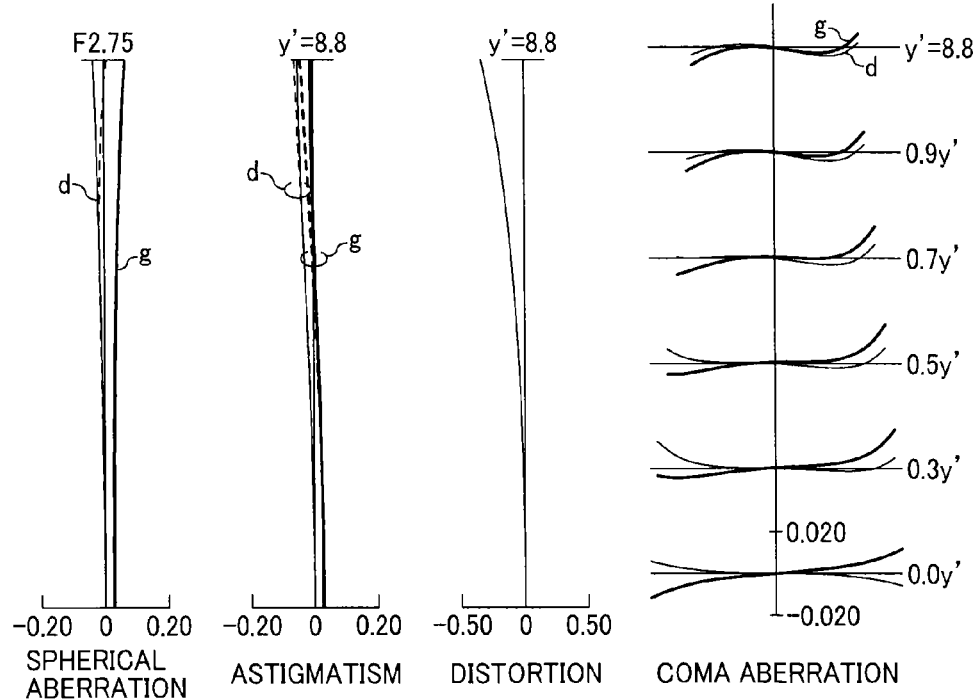
FIG. 33 is a diagram illustrating aberrations of the image forming lens according to the third example of the second embodiment in a state that focusing is performed at a working distance of 0.3 m.

FIGS. 32 to 34 are diagrams illustrating aberrations of the image forming lens according to the third example in the same manner as FIGS. 26 to 28.

FIGS. 35 to 37 are diagrams illustrating aberrations of the image forming lens according to the fourth example in the same manner as FIGS. 26 to 28.

Figure 40:
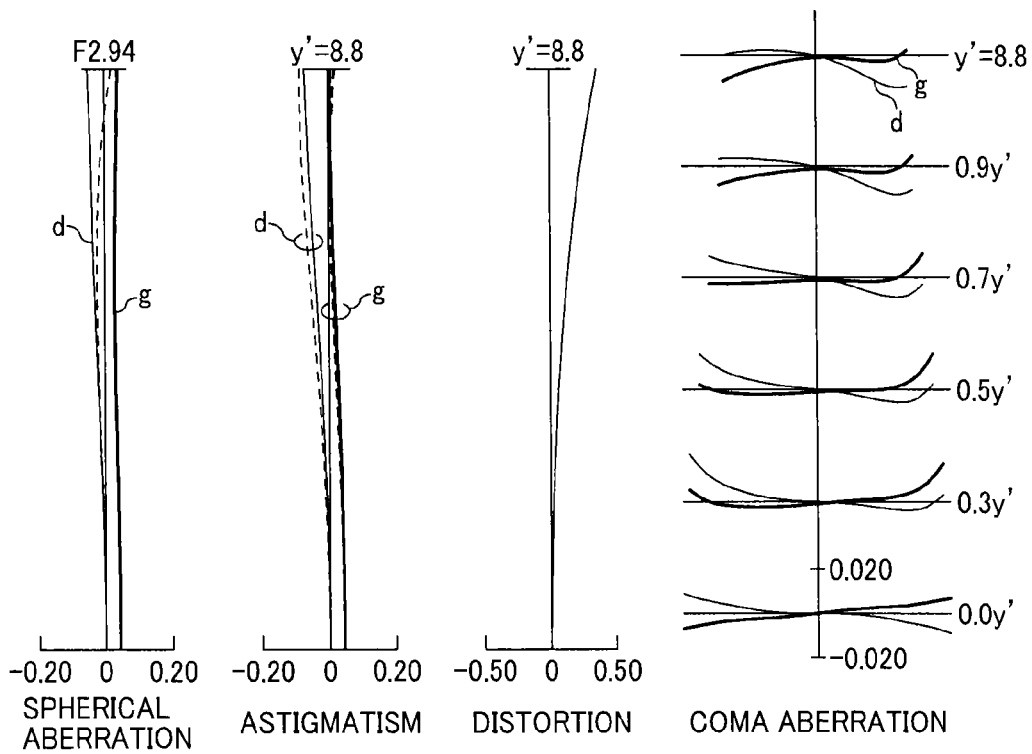
FIG. 40 is a diagram illustrating aberrations of the image forming lens according to the fifth example of the second embodiment in a state that focusing is performed at a working distance of 0.2 m.

FIGS. 38 to 40 are diagrams illustrating aberrations of the image forming lens according to the fifth example in the same manner as FIGS. 26 to 28.

As illustrated in the diagrams of aberrations in the respective examples, the aberrations are corrected at a high level, change of field curvature due to focusing is also favorably suppressed in all of the respective examples.

The spherical aberration is "changed from a plus to a minus" due to focusing, but a change amount is small enough in an absolute value.

An axial chromatic aberration and a chromatic aberration of magnification are also small, and a coma aberration and a color difference thereof are suppressed well up to outermost peripheral portions. Moreover, distortion is also less than 0.7% as in absolute value.

More specifically, according to all of the image forming lenses in the first to fifth examples, various kinds of aberrations are sufficiently reduced, resolving power supporting an image sensor of 6 million to 12 million pixels is provided, the absolute value of distortion is less than 1%, and a high-performance image forming lens having performance little varied due to focusing is achieved.

Further, the F number is 2.8 or less, achieving brightness with a large aperture.

Moreover, in all of the image forming lenses in the first to fifth examples, all of the lenses forming the first lens group G1 to the third lens group G3 are spherical lenses, and all of these lenses are made of the "inorganic solid material" as described above.

An exemplary system of an "image input device for machine vision" using an image capturing device will be described based on FIG. 41.

Figure 41:
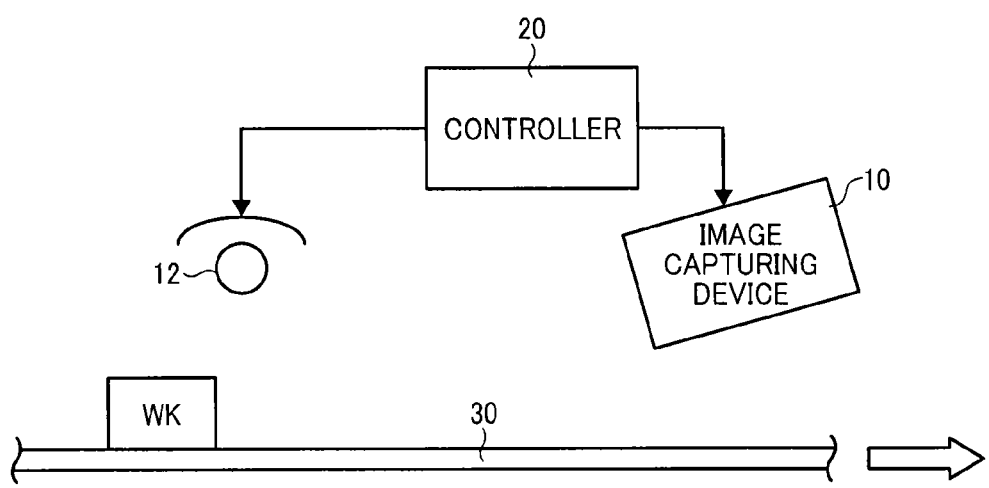
FIG. 41 is a diagram illustrating a system of an image capturing device according to one embodiment.

This "system" is adopted to perform product inspection, and an image of a work WK is captured and input as an image by an image capturing device 10 while the work WK is conveyed rightward of FIG. 41 as an inspection object by a conveyer 30.

An image forming lens described in any one of the examples of the above-described first and second embodiments is used in the image capturing device 10.

A controller 20 formed as a computer, a central processing unit (CPU), or the like controls driving of a conveyer 30 and blinking of a lighting system 12, and additionally controls "focusing of an image forming lens and image capturing by an image sensor" inside the image capturing device 10.

As the work WK, products in various sizes are inspected, and the controller 20 specifies an appropriate working distance according to the size of the work WK, and controls focusing of the image forming lens in accordance with the specified working distance.

As described above, the image capturing device using the above-described image forming lens can be achieved.

While preferred working examples of the present invention have been described above, the present invention is not limited to the above specific embodiments, and various kinds of modifications and changes can be made in a scope of the gist of the present invention recited in the claims, unless otherwise specifically stated in the above description.

More specifically, the image forming lens of the present invention can be applied not only to the image input device for machine vision but also to a digital camera, a video camera, a monitoring camera, and so on.

The effects according to the working examples of the present invention are merely exemplary preferred effects brought by the present invention, and the effects brought by the present invention are not limited to "those recited in the working examples".

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image forming lens comprising in order from an object side to an image side, a first lens group having positive refractive power, an aperture stop, a second lens group having positive refractive power, and a third lens group having positive or negative refractive power, said lens groups and stop being sequentially arranged in said order with no intervening lenses or lens groups, in which when focusing is performed from a long distance to a short distance, the third lens group is fixed relative to an image surface, and the first lens group, the aperture stop, and the second lens group are moved integrally to the object side, wherein the third lens group consists of from the object side to the image side, two lenses in order of a negative lens and a positive lens, said lenses being sequentially arranged in said order with no intervening lenses or lens groups, and a conditional expression (1) is satisfied:

$$0.20 < D/L_{3F-I} < 0.60 \quad (1),$$

where

D is an air space between the negative lens and the positive lens in the third lens group, and $L_{3F-I}$ is a distance from an object-side surface of the negative lens of the third lens group to the image surface and a conditional expression (3) is satisfied:

$$1.10 < f/f_{1-2} < 1.40 \quad (3),$$

where f is the focal length of the entire system in the state that focusing is performed on an infinite distance object, and $f_{1-2}$ is a composite focal length of the first lens group and the second lens group.

2. The image forming lens according to claim 1, wherein a conditional expression (2) is satisfied:

$$0.15 < D/f < 0.40 \quad (2),$$

where

D is the air space between the negative lens and the positive lens in the third lens group, and f is a focal length of an entire system in a state that focusing is performed on an infinite distance object.

3. The image forming lens according to claim 1, wherein a conditional expression (4) is satisfied:

$$-0.15 < (r_{3NR} - r_{3PF})/(r_{3NR} + r_{3PF}) < 0.05 \quad (4),$$

where $r_{3NR}$ is a curvature radius of an image-side surface of the negative lens in the third lens group, and $r_{3PF}$ is a curvature radius of an object-side surface of the positive lens in the third lens group.

4. The image forming lens according to claim 1, wherein the first lens group comprises three lenses by arranging, on the image side of two positive lenses, a negative lens having a concave surface oriented to the image side, and the second lens group comprises three lenses by arranging, on the object side of two positive lenses, a negative lens having a concave surface oriented to the object side, or comprises four lenses being sequentially arranged in order from the object side with no intervening lenses or lens groups of a positive lens having a concave surface oriented to the object side, and a negative lens on the object side of the two positive lenses.

5. The image forming lens according to claim 4, wherein a conditional expression (5) is satisfied:

$$1.20 < f_1/f_{1-2} < 4.00 \quad (5),$$

where $f_1$ is a focal length of the first lens group, and $f_{1-2}$ is the composite focal length of the first lens group and the second lens group.

6. The image forming lens according to claim 4, wherein a conditional expression (6) is satisfied:

$$-0.15 < (r_{1NR} + r_{2NF})/(r_{1NR} - r_{2NF}) < 0.05 \quad (6),$$

where $r_{1NR}$ is a curvature radius of an image-side surface of the negative lens in the first lens group, and $r_{2NF}$ is a curvature radius of an object-side surface of the negative lens of the second lens group.

7. The image forming lens according to claim 4, wherein when a partial dispersion ratio $\theta_{g,F}$ of lens material is defined by refractive indexes $n_g$, $n_F$, $n_C$ with respect to g line, F line, and C line of the lens material as $\theta_{g,F} = (n_g - n_F)/(n_F - n_C)$, conditional expressions (7), (8), and (9) are satisfied:

$$1.58 < n_d < 1.63 \quad (7),$$

$$62.0 < v_d < 70.0 \quad (8), \text{ and}$$

$$0.004 < \theta_{g,F} - (-0.001742 \times v_d + 0.6490) < 0.030 \quad (9),$$

where $n_d$ is a refractive index, $v_d$ is an Abbe's number, and $\theta_{g,F}$ is the partial dispersion ratio of material quality of the positive lens arranged closest to the object side in the first lens group.

8. The image forming lens according to claim 1, wherein material quality of all of the lenses forming the first lens group to the third lens group is inorganic solid material.

9. An image capturing device including an image forming lens according to claim 1.

10. An image forming lens comprising in order from an object side to an image side, a first lens group having positive refractive power, an aperture stop, a second lens group having positive refractive power, and a third lens group having positive or negative refractive power, said lens groups and stop being sequentially arranged in said order with no intervening lenses or lens groups, in which when focusing is performed from a long distance to a short distance, the third lens group is fixed relative to an image surface, and the first lens group, the aperture stop, and the second lens group are moved integrally to the object side, wherein the third lens group comprises from the object side to the image side, two lenses in order of a negative lens and a positive lens, said lenses being sequentially arranged in said order with no intervening lenses or lens groups, a conditional expression (11) is satisfied:

$$4.0 < D/L_{2G-3G} < 12.0 \quad (11),$$

where

D is an air space between the negative lens and the positive lens in the third lens group, and $L_{2G-3G}$ is a distance on an optical axis from a surface closest to the image side in the second lens group to a surface closest to the object side in the third lens group in a state that focusing is performed on an infinite distance object, a lens closest to the object side in the first lens group is a positive lens, and when a partial dispersion ratio $\theta_{g,F}$ of lens material is defined by refractive indexes $n_g$, $n_F$, $n_C$ with respect to g line, F line, and C line of the lens material as $\theta_{g,F} = (n_g - n_F)/(n_F - n_C)$, conditional expressions (16), (17), and (18) are satisfied:

$$1.58 < n_d < 1.63 \quad (16),$$

$$62.0 < v_d < 70.0 \quad (17), \text{ and}$$

$$0.004 < \theta_{g,F} - (-0.001742 \times v_d + 0.6490) < 0.030 \quad (18),$$

where
n_d is a refractive index, $v_d$ is an Abbe's number, and $\theta_{g,F}$ is the partial dispersion ratio of material quality of the positive lens arranged closest to the object side in the first lens group.

11. The image forming lens according to claim 10, wherein
an image-side surface of the negative lens in the third lens group is a concave surface, and an object-side surface of the positive lens in the third lens group is a convex surface, and
a conditional expression (12) is satisfied:

$$-0.25 < (r_{3NR} - r_{3PF})/(r_{3NR} + r_{3PF}) < 0.05 \quad (12),$$

where
$r_{3NR}$ is a curvature radius of the image-side surface of the negative lens in the third lens group, and $r_{3PF}$ is a curvature radius of the object-side surface of the positive lens in the third lens group.

12. The image forming lens according to claim 10, wherein
the first lens group comprises three lenses by arranging, on the image side of two positive lenses, a negative lens having a concave surface oriented to the image side, and
the second lens group includes, on the object side of two positive lenses, at least one negative lens having a concave surface oriented to the object side.

13. The image forming lens according to claim 12, wherein the second lens group comprises four lenses by arranging, on the object side of two positive lenses, a negative lens having a concave surface oriented to the object side, and on the object side of the negative lens, a positive lens having a concave surface oriented to the object side.

14. The image forming lens according to claim 12, wherein a conditional expression (13) is satisfied:

$$1.20 < f_1/f_{1-2} < 4.00 \quad (13),$$

where
$f_1$ is a focal length of the first lens group, and $f_{1-2}$ is a composite focal length of the first lens group and the second lens group.

15. The image forming lens according to claim 12, wherein a conditional expression (14) is satisfied:

$$-0.15 < (r_{1NR} + r_{2NF})/(r_{1NR} - r_{2NF}) < 0.05 \quad (14),$$

where
$r_{1NR}$ is a curvature radius of an image-side surface of the negative lens having the concave surface oriented to the image side in the first lens group, and $r_{2NF}$ is a curvature radius of an object-side surface of the negative lens having the concave surface oriented to the object side in the second lens group.

16. The image forming lens according to claim 10, wherein a conditional expression (15) is satisfied:

$$1.10 < f/f_{1-2} < 1.40 \quad (15),$$

where
f is a focal length of an entire system in the state that focusing is performed on an infinite distance object, and $f_{1-2}$ is the composite focal length of the first lens group and the second lens group.

17. The image forming lens according to claim 10, wherein material quality of all of the lenses forming the first lens group to the third lens group is inorganic solid material.

18. An image capturing device including the image forming lens according to claim 10.

19. An image forming lens comprising in order from an object side to an image side, a first lens group having positive refractive power, an aperture stop, a second lens group having positive refractive power, and a third lens group having positive or negative refractive power, said lens groups and stop being sequentially arranged in said order with no intervening lenses or lens groups, in which when focusing is performed from a long distance to a short distance, the third lens group is fixed relative to an image surface, and the first lens group, the aperture stop, and the second lens group are moved integrally to the object side,
wherein
the third lens group consists of from the object side to the image side, two lenses in order of a negative lens and a positive lens, said lenses being sequentially arranged in said order with no intervening lenses or lens groups, and
a conditional expression (1) is satisfied:

$$0.20 < D/L_{3F-I} < 0.60 \quad (1),$$

where
D is an air space between the negative lens and the positive lens in the third lens group, and $L_{3F-I}$ is a distance from an object-side surface of the negative lens of the third lens group to the image surface, and
a conditional expression (2) is satisfied:

$$0.181 \leq D/f < 0.40 \quad (2),$$

where
D is the air space between the negative lens and the positive lens in the third lens group, and f is a focal length of an entire system in a state that focusing is performed on an infinite distance object.

* * * * *